US012610953B2

(12) United States Patent
Papadopoulos

(10) Patent No.: US 12,610,953 B2
(45) Date of Patent: Apr. 28, 2026

(54) AGROCHEMICAL METHOD

(71) Applicant: CROP INTELLECT LTD, Lincoln (GB)

(72) Inventor: Apostolos Papadopoulos, Lincoln (GB)

(73) Assignee: Crop Intellect Ltd. (GB)

( * ) Notice: Subject to any disclaimer, the term of this patent is extended or adjusted under 35 U.S.C. 154(b) by 307 days.

(21) Appl. No.: 18/254,299

(22) PCT Filed: Nov. 26, 2021

(86) PCT No.: PCT/GB2021/053075
§ 371 (c)(1),
(2) Date: May 24, 2023

(87) PCT Pub. No.: WO2022/112779
PCT Pub. Date: Jun. 2, 2022

(65) Prior Publication Data
US 2024/0016156 A1     Jan. 18, 2024

(30) Foreign Application Priority Data

Nov. 26, 2020     (GB) ...................................... 2018591

(51) Int. Cl.
| *A01N 59/16* | (2006.01) |
| *A01P 21/00* | (2006.01) |
| *B01J 21/06* | (2006.01) |
| *B01J 35/39* | (2024.01) |

(52) U.S. Cl.
CPC .............. *A01N 59/16* (2013.01); *A01P 21/00* (2021.08); *B01J 21/063* (2013.01); *B01J 35/39* (2024.01)

(58) Field of Classification Search
CPC ................................. A01N 59/16; A01P 21/00
See application file for complete search history.

(56) References Cited

U.S. PATENT DOCUMENTS

| 6,110,867 A | * | 8/2000 | Glenn | .................... | A01N 59/06 |
| | | | | | 504/120 |
| 2006/0246151 A1 | * | 11/2006 | Anderson | .............. | A01N 59/16 |
| | | | | | 424/617 |
| 2008/0269054 A1 | * | 10/2008 | Fleute-Schlachter | ........................ | |
| | | | | | A01N 59/16 |
| | | | | | 504/121 |

FOREIGN PATENT DOCUMENTS

| CN | 104478623 | A | 4/2015 |
| CN | 107333809 | A | 11/2017 |
| CN | 107306994 | A | 6/2020 |
| KR | 20110073722 | A | 6/2011 |
| WO | 2004105487 | A1 | 12/2004 |
| WO | 2019098959 | A2 | 5/2019 |

OTHER PUBLICATIONS

Kang et al., "Facile Preparation and Photocatalytic Activity of TiO2 Microspheres with a Diameter of 1-8 μm", 2014, Advanced Materials Research, vols. 881-883, pp. 990-993. (Year: 2014).*

International Search Report and Written Opinion for Application No. PCT/GB2021/053075, mailed Feb. 23, 2022, 8 pages.

J.S Dalton et al, "Photocatalytic oxidation of NO x gases using TiO 2: a surface spectroscopic approach", Jan. 1, 2002 (Jan. 1, 2002), p. 415-422, Retrieved from the Internet: URL:http://nathan.instras. com/documentDB/paper-236.pdf.

Rodríguez-González Vicente et al, "Applications of photocatalytic titanium dioxide-based nanomaterials in sustainable agriculture", Journal of Photochemistry, Elsevier, Jun. 20, 2019, vol. 40, p. 49-67.

Yang Fan et al, "The Improvement of Spinach Growth by Nano-anatase TiO2 Treatment Is Related to Nitrogen Photoreduction", Biological Trace Element Research, Sep. 12, 2007 (Sep. 12, 2007), vol. 119, No. 1, p. 77-88.

Khan M. Nasir et al, "Nitric oxide is involved in nano-titanium dioxide-induced activation of antioxidant defense system and accumulation of osmolytes under water-deficit stress in Vicia faba L", Ecotoxicology and Environmental Safety, Academic Press US, Jan. 9, 2020 (Jan. 9, 2020), vol. 190, 13 pages.

Deng Q.R. et al, "Mn-doped TiOnanopowders with remarkable visible light photocatalytic activity", Materials Letters, Elsevier NL, Apr. 1, 2011, vol. 65, No. 13, p. 2051-2054.

Yan Wang et al, "The Application of Nano-TiO Photo Semiconductors in Agriculture", Nanoscale Research Letters, Springer, US, vol. 11, No. 1, Nov. 28, 2016, pp. 1-7.

Combined Search and Examination Report under Sections 17 & 18(3), and list of documents, GB Intellectual Property Office, May 25, 2021, 4 pages.

* cited by examiner

*Primary Examiner* — Michael B. Pallay
(74) *Attorney, Agent, or Firm* — Julie K. Staple; Fishman Stewart PLLC

(57) ABSTRACT

A method of increasing growth of a plant, the method comprising applying a titanium dioxide photocatalyst to a surface of the plant, and converting nitrogen monoxide or nitrogen dioxide to nitrate on the surface of the plant.

19 Claims, 10 Drawing Sheets

AGROCHEMICAL METHOD

CROSS-REFERENCE TO RELATED APPLICATION

This application claims priority to co-pending PCT International Application Serial No. PCT/GB2021/053075 filed Nov. 26, 2021, which claims priority to GB Patent Application No. 2018591.4 filed on Nov. 26, 2020, the entire content of both of which is incorporated herein by reference.

The present invention relates to a method of improving plant growth using a titanium dioxide photocatalyst, a titanium dioxide photocatalyst, an agrochemical composition comprising a titanium dioxide photocatalyst, a process for preparing a titanium dioxide photocatalyst and/or an agrochemical composition comprising a titanium dioxide photocatalyst, and the use of a titanium dioxide photocatalyst.

BACKGROUND TO THE INVENTION

Managing nitrogen pollution is a significant focus of governments and companies across the world at least because (i) source nitrogen pollution is known to damage the natural environment, for example via eutrophication (as is the case with over fertilisation in agriculture); and (ii) because atmospheric nitrogen pollution is a known contributor to global warming, acid rain, and human and animal conditions/diseases (as is the case with nitrous oxides formed in combustion). However, nitrogen pollution is a constant product of industry and agriculture and has traditionally been difficult to address using market forces alone. As such, governments have enacted legal instruments that are directed at encouraging technologies that limit the amount of nitrogen pollution.

In industry, efforts have traditionally focused on reducing the total amount of nitrous oxides emitted. For example, technologies have been developed that lead to cleaner combustion and/or reduce nitrous oxides from the waste gases of combustion chambers. Cleaner energy sources are also being heavily invested in for the same reasons. However, these technologies and energy sources are currently not effective enough to reduce the nitrous oxide output of industry to acceptable levels.

In agriculture, efforts have focused on reducing fertiliser application, developing less harmful fertilisers, growing perennial crops instead of annual crops, growing winter cover crops, developing expertise regarding the timing of fertiliser application, and introducing buffer zones near know pollution areas. These measures have all been shown to have some impact on reducing the effect of nitrogen pollution in the natural environment. However, they are expensive to implement and often have drawbacks associated with them (such as reduced crop yield and/or crop quality). As the population of the world is estimated to increase to approximately 9.8 billion people by the year 2050, such drawbacks are often not economically feasible.

In an emerging field, catalysts have been investigated with the aim of reducing atmospheric nitrogen content. For example, catalysts are known that can convert nitrous oxides to nitrate. These catalysts have been used in paints to coat walls and allegedly reduce nitrous oxide in some conditions (for example, many of these catalyst only work in specific lighting conditions). However, these kinds of products are merely changing one problem for another, i.e. converting atmospheric nitrogen pollution (atmospheric nitrous oxide) into a source nitrogen pollution (nitrate fixed to wall which is then washed off into the local water system). As such, these types of technologies are interesting but cannot significantly address the environmental problems associated with nitrogen pollution. It is coincidental that some catalysts have also been used in agriculture, for example for their antimicrobial properties when applied to the roots or seeds of a plant.

DESCRIPTION OF THE INVENTION

The present invention relates to a method of improving plant growth using a titanium dioxide photocatalyst, a titanium dioxide photocatalyst, an agrochemical composition comprising a titanium dioxide photocatalyst, a process for preparing a titanium dioxide photocatalyst and/or an agrochemical composition comprising a titanium dioxide photocatalyst, and the use of a titanium dioxide photocatalyst.

The present invention is a complete and entirely sustainable approach that both reduces atmospheric nitrogen pollution and improves the growth of a plant (thereby reducing the amount of fertiliser that is required and reducing the deleterious effects associated with such fertiliser application).

FIG. 1 shows the Raman spectra of pure titanium dioxide and of titanium dioxide photocatalysts according to some embodiments of the present invention.

FIGS. 2A-D show the efficacy of a titanium dioxide photocatalyst according to some embodiments of the present invention under visible light and under UV light.

Figure 1:
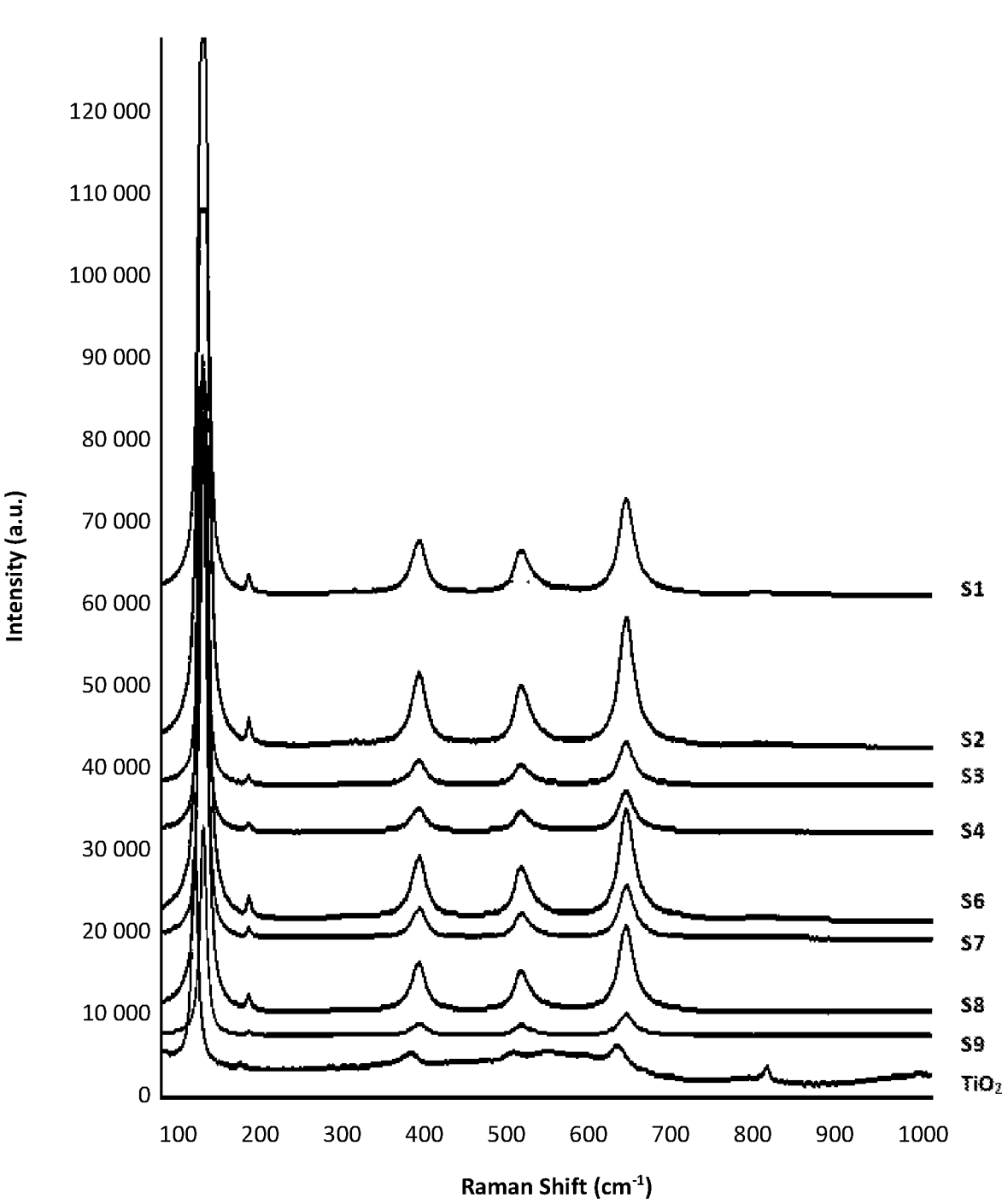

In one aspect, the invention provides a method of improving plant growth. The method comprises applying a titanium dioxide photocatalyst to a surface of a plant, and converting nitrogen monoxide or nitrogen dioxide to nitrate on the surface of the plant.

In one aspect, the invention provides a method of increasing growth of a plant, the method comprising applying a titanium dioxide photocatalyst to a surface of the plant, and converting nitrogen monoxide or nitrogen dioxide to nitrate on the surface of the plant.

In one aspect, the invention provides a method of improving crop yield/growth comprising applying a titanium dioxide photocatalyst to a surface of a plant, contacting the titanium dioxide photocatalyst with nitrogen monoxide or nitrogen dioxide so as to convert nitrogen monoxide or nitrogen dioxide to nitrate, and the nitrate being absorbed by the surface of the plant.

In one aspect, the invention provides the use of a titanium dioxide photocatalyst for improving crop yield/growth by applying a titanium dioxide photocatalyst to a surface of a plant.

In one aspect, the invention provides an agrochemical composition comprising a particulate titanium dioxide photocatalyst, wherein the particulate titanium photocatalyst has a mean diameter of greater than about 2 µm, preferably greater than about 5 µm, more preferably greater than about 8 µm.

In one aspect, the invention provides a method of supplying nitrate to the surface of a plant using a doped photocatalyst.

In one aspect, the invention provides the use of a doped photocatalyst to produce nitrate on the surface of plants.

In one aspect, the invention provides a method of converting NOx to nitrate on the surface of a plant to improve growth.

In one aspect, the invention provides a method to produce nitrate on a plant surface by depositing a doped photocatalyst which converts atmospheric nitrous oxides (NOx) to nitrate.

In one aspect, the invention provides the use of a double doped photocatalyst deposited on the surface of plants to convert atmospheric NOx into nitrate available for plant uptake.

In one aspect, the invention provides the use of a double doped photocatalyst deposited on the surface of plants to convert atmospheric NOx into nitrate available/absorbed as plant feed.

In one aspect, the invention provides a method to generate nitrate from atmospheric NOx using a double doped photocatalyst comprising of titanium dioxide and the deposition of the nitrate on the plant's surface to utilise it as building block/feed/for growth.

In one aspect, the invention provides a method to provide a continuous supply of nitrate to plants by spraying a double doped photocatalytic material comprising of $TiO_2$ to increase plant growth.

Plant growth encompasses (i) the amount of plant growth and (ii) the quality of plant growth. For example, plant growth may encompass plant yield (e.g. natural plant weight or dry plant weight) and/or the content of the plant (e.g. elemental composition, protein content, moisture content, and/or Hagberg content).

In one embodiment, the method comprises, contacting the titanium dioxide photocatalyst with nitrogen monoxide or nitrogen dioxide to convert nitrogen monoxide or nitrogen dioxide to nitrate.

In one embodiment, the nitrate is absorbed by the plant, preferably by the surface of the plant. The method of the invention therefore provides the plant with a usable source of nitrogen.

In one embodiment, the method comprises spraying the titanium dioxide photocatalyst onto a surface of a plant, e.g. by means of an electrostatic or other conventional sprayer.

In other embodiments, the method comprises applying the titanium dioxide photocatalyst onto a surface of a plant, e.g. by fumigation or by dusting.

In some embodiments, the surface of the plant includes the foliage and/or leaves and/or stems of the plant. The surface of the plant does not include the roots and or seeds of a plant.

In one embodiment, the nitrogen monoxide or nitrogen dioxide is atmospheric nitrogen monoxide or nitrogen dioxide. The invention therefore provides a method of reducing the concentration of atmospheric nitrogen monoxide or nitrogen dioxide in an environment, preferably an environment with a high concentration of nitrogen monoxide or nitrogen dioxide. Such an environment may be near a source of nitrogen monoxide or nitrogen dioxide production, such as a road, port, or factory.

In one embodiment, the method comprises contacting the titanium dioxide photocatalyst with rainwater/water/dew that is present on the surface of the plant. Without wishing to be bound by theory, it is understood that the rainwater/water/dew that collects on the surface of the plant contributes to efficient nitrate production/conversion. It is also understood that the rainwater/water/dew solubilises the nitrate so that it enhances its availability for uptake by the plant.

In one embodiment, the nitrate is washed from the titanium dioxide photocatalyst by application of a water source to the surface of the plant. The water source may be naturally applied (i.e. rain) or artificially applied (i.e. involving human influence such as irrigation or other watering techniques). Washing of the nitrate from the titanium dioxide photocatalyst allows for the titanium dioxide photocatalyst to be partially or fully reactivated. The method of the invention therefore provides a time and cost effective way of improving crop yield/crop growth because few (preferably only one or two) applications to the plant is required.

In one embodiment, the method comprises providing the plant with nitrate for a period of at least about 30 days, preferably at least about 45 days, more preferably at least about 60 days. The method of the invention therefore provides a method of improving crop yield/crop growth over an extended period of time, preferably over multiple growth stages.

In one embodiment, the method comprises applying the titanium photocatalyst once per 10 days/growing cycle, preferably once per 30 days/growing cycle, more preferably once per 60 days/growing cycle.

When applied to the plant, the titanium dioxide photocatalyst may be applied in amount from about 50 g/ha (hectare) to about 80 g/ha, from about 100 g/ha to about 250 g/ha, or from about 200 g/ha to about 500 g/ha. For example, the titanium dioxide photocatalyst may be applied in an amount of about 400 g/ha or about 500 g/ha.

In some embodiments, plant growth includes plant weight, ear weight, flag leaf weight, total yield or a mixture thereof.

In some embodiments, the method comprises improving plant growth by between about 0.1% and about 20%, or between about 1% and about 15%, or between about 5% and about 10%.

In some embodiments, the method comprises applying a fertiliser to the plant, for example by spraying the plant with a fertiliser. A fertiliser may be any fertiliser but in particular may be a composition or formulation comprising one or more of nitrogen, phosphorous, and/or potassium. For example, the fertiliser may be an NPK fertiliser. The ratio of N:P:K in the NPK fertiliser may be for example 20:0:0, 15:0:5; or 8:4:16. The fertiliser may be applied to the plant with or separately to the titanium dioxide photocatalyst. For example, the fertiliser may be comprised in the same formulation/composition as the titanium dioxide photocatalyst, Photocatalyst In one embodiment, the titanium dioxide photocatalyst is a particulate titanium dioxide photocatalyst. In one embodiment, the particulate titanium dioxide photocatalyst has a mean diameter greater than about 1 μm, about 2 μm, about 5 μm, about 8 μm or about 10 μm. Preferably, the particulate titanium dioxide photocatalyst has a mean diameter greater than about 8 μm or about 10 μm. In some embodiments, the titanium dioxide photocatalyst of the invention will not be absorbed by the plant.

In some embodiments, the particulate titanium dioxide photocatalyst has a mean diameter of no more than about 25 μm, about 20 μm, about 15 μm, or about 10 μm. In some embodiments, the titanium dioxide photocatalyst of the invention will not easily be washed off the plant.

In some embodiments, the particulate titanium dioxide photocatalyst has a mean diameter from about 2 μm or about 5 μm to about 10 μm or about 15 μm. Preferably, the particulate titanium dioxide photocatalyst has a mean diameter from about 2 μm to about 20 μm. Preferably, the particulate titanium dioxide photocatalyst has a mean diameter from about 2 μm to about 15 μm. More preferably, the particulate titanium dioxide photocatalyst has a mean diameter from about 2 μm to about 10 μm. More preferably, the particulate titanium dioxide photocatalyst has a mean diameter from about 2 μm to about 8 μm. In some embodiments, the titanium dioxide photocatalyst of the invention will not be absorbed by the plant and will not easily be washed off the plant.

In one embodiment, at least about 90 vol. % of the particulate titanium dioxide photocatalyst has a diameter of less than about 35 μm, about 30 μm, about 25 μm, about 20 μm, about 15 μm, about 10 μm, or about 8 μm. Preferably, at least about 90 vol. % of the particulate titanium dioxide photocatalyst has a diameter of less than about 10 μm, more preferably less than about 8 μm.

In one embodiment, at least about 90 vol. % of the particulate titanium dioxide photocatalyst has a diameter of greater than about 0.1 μm, about 0.5 μm, about 1 μm, or about 2 μm. Preferably, at least about 90 vol. % of the particulate titanium dioxide photocatalyst has a diameter of greater than about 1 μm, more preferably greater than about 2 μm.

In one embodiment, at least about 90 vol. % of the particulate titanium dioxide photocatalyst has a diameter of less than about 30 μm and at least about 90 vol. % of the particulate titanium dioxide photocatalyst has a diameter of greater than about 0.1 μm. In one embodiment, at least about 90 vol. % of the particulate titanium dioxide photocatalyst has a diameter of less than about 25 μm and at least about 90 vol. % of the particulate titanium dioxide photocatalyst has a diameter of greater than about 0.5 μm. Preferably, at least about 90 vol. % of the particulate titanium dioxide photocatalyst has a diameter of less than about 20 μm and at least about 90 vol. % of the particulate titanium dioxide photocatalyst has a diameter of greater than about 1 μm. Preferably, at least about 90 vol. % of the particulate titanium dioxide photocatalyst has a diameter of less than about 15 μm and at least about 90 vol. % of the particulate titanium dioxide photocatalyst has a diameter of greater than about 2 μm. Preferably, at least about 90 vol. % of the particulate titanium dioxide photocatalyst has a diameter of less than about 10 μm and at least about 90 vol. % of the particulate titanium dioxide photocatalyst has a diameter of greater than about 2 μm. Preferably, at least about 90 vol. % of the particulate titanium dioxide photocatalyst has a diameter of less than about 8 μm and at least about 90 vol. % of the particulate titanium dioxide photocatalyst has a diameter of greater than about 2 μm.

According to some embodiments, it is possible to prepare a preferred suspension for spraying onto a plant, the suspension provides a titanium dioxide photocatalyst with a maximum surface area (to provide a highest photocatalytic activity) without being absorbed by the plant or being easily washed off.

In one embodiment, the titanium dioxide photocatalyst is a powder.

In one embodiment, at least about 70 vol. % of the particulate titanium dioxide photocatalyst has a diameter of about 1 μm, about 2 μm, about 5 μm, about 8 μm, or about 10 μm. Preferably, at least about 80 vol. %, about 90 vol. %, about 95 vol. % or about 98 vol. % of the particulate titanium dioxide photocatalyst has a diameter of about 1 μm, about 2 μm, about 5 μm, about 8 μm, or about 10 μm. In one embodiment, at least about 95 vol. % of the particulate titanium dioxide photocatalyst has a diameter of about 10

μm. In one embodiment, at least about 98 vol. % of the particulate titanium dioxide photocatalyst has a diameter of about 10 μm.

In one embodiment, at least about 70 vol. % of the particulate titanium dioxide has a diameter between about 2 μm and about 10 μm. In one embodiment, at least about 80 vol. % of the particulate titanium dioxide has a diameter between about 2 μm and about μm. In one embodiment, at least about 90 vol. % of the particulate titanium dioxide has a diameter between about 2 μm and about 10 μm. In one embodiment, at least about 95 vol. % of the particulate titanium dioxide has a diameter between about 2 μm and about 10 μm. In one embodiment, at least about 98 vol. % of the particulate titanium dioxide has a diameter between about 2 μm and about 10 μm.

In one embodiment, the titanium dioxide photocatalyst has a specific surface area of greater than about 3000 m$^2$, about 5000 m$^2$, about 7000 m$^2$, or about 10,000 m$^2$ per 500 g.

In one embodiment, the titanium dioxide photocatalyst comprises a crystalline phase and/or a non-crystalline phase. Preferably, the titanium dioxide photocatalyst comprises a crystalline phase, i.e. the titanium dioxide photocatalyst comprises crystalline titanium dioxide. For example, the titanium dioxide photocatalyst comprises anatase titanium dioxide and/or rutile titanium dioxide. Preferably, the titanium dioxide photocatalyst comprises anatase titanium dioxide and rutile titanium dioxide.

In one embodiment, the ratio of rutile titanium dioxide to anatase titanium dioxide in the titanium dioxide photocatalyst is between about 1:3 and about 1:5. Preferably, the ratio of rutile titanium dioxide to anatase titanium dioxide in the titanium dioxide photocatalyst is about 1:3, about 1:4 or about 1:5, more preferably about 1:3.

In one embodiment, the titanium dioxide photocatalyst is a doped titanium dioxide photocatalyst. For example, the titanium dioxide photocatalyst is doped with at least one dopant selected from the group consisting of alkali metals, alkaline earth metals, and transition metals. When the titanium dioxide photocatalyst is doped with two or more dopants, each dopant may be individually selected from the group consisting of alkali metals, alkaline earth metals, and transition metals, preferably from the group consisting of alkaline earth metals and transition metals. When the titanium dioxide photocatalyst is doped with two dopants, one dopant may be an alkaline earth metal and the other dopant may be a transition metal. The titanium dioxide photocatalyst of the invention has been shown to be particularly effective conversion of nitrogen monoxide or nitrogen dioxide to nitrate in sunlight.

For example, the titanium dioxide photocatalyst is doped with at least one of the following dopants Mn, Ca, Mg, Zn, N, Mg and K, preferably Mn, Ca, Mg, Zn, and K. In one embodiment, the titanium dioxide photocatalyst is doped with at least two of the following dopants Mn, Ca, Mg, Zn, N, Mg and K, preferably Mn, Ca, Mg, Zn, and K. Preferably, the titanium dioxide photocatalyst is doped with Mn and Ca.

When the titanium dioxide photocatalyst is a doped with two dopants, the ratio of a first of the two dopants to a second of the two dopants is between about 10:1 and about 1:10, preferably between about 7:1 and about 1:7, preferably between about 5:1 and about 1:5, preferably between about 2:1 and about 1:2.

In one embodiment, the ratio of a first of the two dopants to a second of the two dopants is between about 7:1 and about 1:1. In one embodiment, the ratio of a first of the two dopants to a second of the two dopants is between about 5:1 and about 1:1. In one embodiment, the ratio of a first of the two dopants to a second of the two dopants is between about 3:1 and about 1:1. Preferably, the ratio of a first of the two dopants to a second of the two dopants is about 5:1, about 3:1, or about 1:1, more preferably about 3:1.

In one embodiment, the titanium dioxide photocatalyst comprises the dopant in an amount between about 0.01 wt. % and about 1 wt. %, or between about 0.05 wt. % and about 0.5 wt. %, or between about 0.075 wt. % to about 0.25 wt. % relative to the total weight of the titanium dioxide photocatalyst. Preferably, the titanium dioxide photocatalyst comprises the dopant in an amount between about 0.075 wt. % to about wt. % relative to the total weight of the titanium dioxide photocatalyst.

In one embodiment, the titanium dioxide photocatalyst comprises the dopant in an amount about 0.075 wt. %, about 0.1 wt. % or about 0.25 wt. % relative to the total weight of the titanium dioxide photocatalyst. Preferably, the titanium dioxide photocatalyst comprises the dopant in an amount about 0.1 wt. % relative to the total weight of the titanium dioxide photocatalyst.

In one embodiment, the titanium dioxide photocatalyst is catalytically active when exposed to light with a wavelength between about 300 and about 800 nm, preferably between about 300 and about 700 nm, about 300 and about 600 nm, about 300 and about 550 nm, about 300 and about 520 nm, or about 350 and about 500 nm. Preferably, the titanium dioxide photocatalyst is catalytically active when exposed to light with a wavelength between about 430 and about 550 nm.

In one embodiment, the titanium dioxide photocatalyst has a maximum absorbance at about 400 nm, about 450 nm or about 500 nm. Preferably, the titanium dioxide photocatalyst has a maximum absorbance at about at about 450 nm.

When the titanium dioxide photocatalyst is catalytically active or has a maximum absorbance as defined in relation to some embodiments, the titanium dioxide photocatalyst is particularly effective at supplying the plant with nitrate. Without wishing to be bound by theory, it is believed that this is because the catalytic activity corresponds to daytime environmental conditions (when the ambient outdoor light and NOx concentrations are most suitable for efficient nitrate production).

In one embodiment, the titanium dioxide photocatalyst is not comprised in a separate physical body or a porous body. For example, the titanium dioxide photocatalyst is not comprised in a zeolite or other porous body. The titanium dioxide photocatalyst of the invention may therefore be in direct contact with the plant surface. As such, the nitrate produced is in close proximity (e.g. in direct contact) with the plant surface which aids in uptake of the nitrate.

Agrochemical Composition

In one embodiment, the titanium dioxide photocatalyst is part of an agrochemical composition. For example, an agrochemical composition comprising the titanium dioxide photocatalyst dissolved in or suspended in an aqueous or non-aqueous medium. Preferably, the medium is water based. More preferably, the medium is water.

In some embodiments, the composition comprises an active ingredient selected from the group consisting of harpin, systemin, oligouronides, chitosan, carbanilide, calreticulin, flagellin and β-glucan-containing elicitors.

In some embodiments, the composition comprises other conventional agrochemical ingredients such as agrochemical nutrients (such as macro and micro nutrients), and agro-chemically acceptable excipients. Suitable macro nutrients include but are not limited to sources of nitrogen, phosphorous, potassium, sulphur and calcium. Suitable micro nutrients include but are not limited to sources of manganese, boron and zinc.

Others include cobalt, chromium, fluoride, iodine, molybdenum, zinc, manganese, selenium and others. Preferably, the composition comprises manganese, zinc and/or molybdenum. In some embodiments, the composition comprises nitrogen, phosphorus, and/or potassium. For example, the composition may comprise an NPK fertiliser. The ratio of N:P:K in the NPK fertiliser may be for example 20:0:0, 15:0:5, or 8:4:16.

In some embodiments, the composition comprises micronutrients, each micronutrient being comprised in amount from 0.01% to about 5% w/w, preferably in an amount between about 0.05% and about 2.5% w/w. In some preferred embodiments, the composition comprises micronutrients, each micronutrient being comprised in an amount of about 0.07%, about 1.3%, or about 2.4% w/w.

In some embodiments, the composition comprises one or more agrochemically acceptable excipients. Examples of such components include water, amino acids, vitamins, seaweed and other plants extracts, weak acids, plant oils, essential oils, metabolic stimulating agents, emulsifiers, thickeners, colouring agents, suspension agents, dispersion agents, carriers or excipients and wetting agents.

As used herein, the expression "weak acid" refers to a weak organic acid such as acetic acid, citric acid, humic acid, fulvic acid or propanoic acid; preferably the weak acid is citric acid.

If required, an emulsifier may be employed in the composition. An emulsifier may be employed to improve the dissolvability of a component. Suitable emulsifiers for use in the compositions of the present invention include any known agriculturally acceptable emulsifier. In particular, the emulsifier may comprise a surfactant such as: fatty alcohol polyethylene glykol ether, typically alkylaryl sulphonates, ethoxylated alcohols, polyalkoxylated butyl ethers, calcium alkyl benzene sulphonates, polyalkylene glycol ethers and butyl polyalkylene oxide block copolymers as are known in the art. Nonyl phenol emulsifiers such as Triton N57™ are particular examples of emulsifiers, which may be used in the compositions of the invention, as are polyoxyethylene sorbitan esters such as polyoxyethylene sorbitan monolaurate (sold by ICI under the trade name "Tween™"). In some instances, natural organic emulsifiers may be preferred, particularly for organic farming applications. Coconut oils such as coconut diethanolamide is an example of such an compound. Palm oil products such as lauryl stearate may also be used. Suitable emulsifiers include commercially available sorbitol products such as Tween® 20, 40, and 60.

In some embodiments, the composition comprises a growth regulator. In one embodiment, the growth regulator, or plant growth regulator, is chosen from the group of plant hormones, or chemical compounds with analogous activity. Suitable examples of such compounds are auxins, cytokines, gibberlins, ethylene precursors (like ethephon), or abscisic acid. In another embodiment, the growth regulator, or plant growth regulator, is a growth inhibitor, like for example chlormequat or mepiquat chloride, certain triazole or triazole like compounds, or prohexadione, daminozide, trinexapac ethyl type compounds, or ethylene inhibitors.

Suitable auxins include natural or synthetic chemicals that behave like the naturally occurring auxins produced by plant enzyme systems, and the term "auxin" and "auxins" as used herein refers to such compounds in natural and synthetic form. Indoleacetic acids, indol-3-butyric acid (3-BA); naphthaleneacetamide; 2 methyl-1-naphthaleneacetic acid and 2-methyl-1-naphthylacetamide have hormonal activity and may be substituted for the naturally occurring auxins. It may be useful to have metal ions present with the auxins, such as for example zinc or manganese. In preferred embodiments, the auxin employed is selected from the group consisting of 3-indolebutyric acid, 3-indoleacetic acid, i-naphthylacetic acid, 3-indolebutyric acid, and salts and esters thereof. Preferably, the metal ions required for a good activity are supplied together with the auxin.

Suitable cytokinins are a class of plant regulation substances (phytohormones) that promote cell division, or cytokinesis, in plant roots and shoots. There are two types of cytokinins: adenine-type cytokinins represented by kinetin, zeatin, and 6-benzylaminopurine (also referred to as BAP, 6-BAP, or 6-benzyladenine), and phenylurea-type cytokinins like diphenylurea (DPU), diphenylthiourea (DPTU) and thidiazuron (TDZ). In preferred embodiments the cytokinin is selected from the group consisting of kinetin (synthetic or derived from seaweed), 6-BAP, 1-(2-chloropyridin-4-yl)-3-phenylurea (CPPU), and TDZ.

In some embodiments, the composition comprises sodium naphthalene sulphonate formaldehyde condensate, a silicon based antifoaming agent, ethoxylated alcohol, a cocoyl hydroxyethyl imidazoline based amphoteric surfactant, xanthan gum or a mixture thereof.

The formulations according to the invention can be applied either as such or after prior dilution with water, or other diluents, i.e. for example, as emulsions, suspensions, solutions, or aerosols.

In a particular preferred embodiment, the formulation is in the form of a concentrate which is diluted with solvent, e.g. water, prior to the actual application. In another embodiment, the formulation is in the form of a diluted formulation containing additional solvent, e.g. water, but retaining the same ratio/proportion of active ingredients found in the concentrate. In some embodiments, the concentrate is a suspension.

The concentration of the titanium dioxide photocatalyst may be from about 1 g/litre (g/l) to about woo g/l, from about 100 g/l to about 700 g/l, from about 200 g/l to about 500 g/l. For example, the concentration of the titanium dioxide photocatalyst may be about 100 g/l, about 200 g/l, about 300 g/l, about 400 g/l, or about 500 g/l.

When applied to the plant, the composition may be applied in amount from about 0.1 l/ha (hectare) to about 100 l/ha, from about 0.5 l/ha to about 10 l/ha, or from about 1 l/ha to about 5 l/ha. For example, the titanium dioxide photocatalyst may be applied in an amount of about 1 l/ha or about 2 l/ha.

In one embodiment, the agrochemical composition is a foliar agrochemical composition.

Photocatalyst Per Se

In a second aspect, the invention provides a titanium dioxide photocatalyst as described herein.

Agrochemical Composition Per Se

In a third aspect, the invention provides an agrochemical composition as described herein.

Process

In a fourth aspect, the invention provides a process of preparing a titanium dioxide photocatalyst according to the second aspect and/or an agrochemical composition according to the third aspect.

In one embodiment, the process comprises providing a raw material comprising or consisting of titanium dioxide; and processing the raw material to provide a titanium dioxide photocatalyst.

In one embodiment, processing the raw material to provide a titanium dioxide photocatalyst comprises:

Adding a source of dopant to the raw material to form a first processed material;

Blending and/or grinding the first processed material to form a second processed material;

Heating the second processed material to form the titanium dioxide photocatalyst.

In one embodiment, the raw material is processed before a source of dopant is added thereto, for example by grinding, milling or sieving. In one embodiment, this processing results in the desired particle size, for example the desired mean diameter.

In one embodiment, the titanium dioxide photocatalyst is further processed, for example by grinding, milling or sieving. In one embodiment, this processing results in the desired particle size, for example the desired mean diameter.

In one embodiment, the raw material comprises or consists of anatase and/or rutile titanium dioxide. Preferably, the raw material comprises between about 65% and about 95% anatase titanium dioxide, or between about 70% and about 90% anatase titanium dioxide, or between about 80% and about 85% anatase titanium dioxide. Preferably, the raw material comprises between about 1% and about 35% rutile titanium dioxide, or between about 10% and about 30% rutile titanium dioxide, or between about 15% and 20% rutile titanium dioxide.

In one embodiment, the raw material is particulate and has mean diameter of about 2 μm or about 10 μm. Preferably, about 70, 80, 90, 95 or 98 vol. % of the raw material has a mean diameter of about 2 μm or about 10 pin.

In one embodiment, the source of dopant is a source of one or more selected from the group consisting of alkali metals, alkaline earth metals, and transition metals, preferably from the group consisting of alkaline earth metals and transition metals. More preferably, the source of dopant is a source of an alkaline earth metal and a transition metal.

In one embodiment, the source of dopant is a source of at least one of the following dopants Mn, Ca, Mg, Zn, N, Mg and K, preferably Mn, Ca, Mg, Zn, and K. In one embodiment, the source of dopant is a source of at least two of the following dopants Mn, Ca, Mg, Zn, N, Mg and K, preferably Mn, Ca, Mg, Zn, and K. Preferably, the source of dopant is a source of Mn and Ca.

When the source of dopant is a source of at least two of the following dopants Mn, Ca, Mg, Zn, N, Mg and K, the ratio of a first dopant to a second dopant is between about 1:1 and about 9:1, preferably between about 1:1 and about 7:1, or between about 1:1 and 5:1, or between about 1:1 and 3:1. For example, the ratio of a first dopant to a second dopant is about 5:1, about 3:1, or about 1:1, more preferably about 3:1.

In one embodiment, the source of dopant comprises a salt of an alkali metal, alkaline earth metal, a transition metal, or a mixture thereof. For example, the source dopant may comprise a nitrate salt, carbonate salt, sulphate salt, a chloride salt, or a mixture thereof. Preferably, the source of dopant comprises a carbonate salt and/or a sulphate salt. For example, the source of dopant may comprise calcium carbonate and/or manganese sulphate. Preferably, the source of dopant comprises calcium carbonate and manganese sulphate.

In one embodiment, source of dopant is a particulate source of dopant. Preferably, the mean particle size of the source of dopant is between about 0.01 μm and about 25 μm, or about 0.1 μm and about 10 μm.

The source of dopant may be added to the raw material in an amount of about 0.01 wt. % to about 5 wt. % relative to the raw material. Preferably, the dopant is added to the raw material in an amount of about 0.01 wt. % to about 2 wt. %, or about 0.2 wt. % to about 1 wt. %, or about 0.5 wt. % to about 1 wt. % relative to the raw material.

In one embodiment, one or more solvents is added to the first processed material, before or during the blending and/or grinding. For example, hydrogen peroxide, potassium hydroxide and/or sulphuric acid may be added to the first processed material.

In one embodiment, blending and/or grinding the first processed material to form a second processed material is carried out using a ball mill, high shear mixer, a pin mill or a mix thereof. Preferably, the blending and/or grinding is first carried out using a ball mill and secondly by a pin mill. Without wishing to be bound by theory, it is understood that ball milling allows the dopant to infuse into the titanium dioxide structure.

Preferably, the blending and/or grinding is carried out for between about 5 minutes and about 90 minutes, preferably between about 30 minutes and about 90 minutes, more preferably between about 60 minutes and about 90 minutes.

In some embodiments, the first processed material is checked for content uniformity during the blending and/or grinding. In some embodiments, the blending and/or grinding is performed until the mixture has a content uniformity of about 90%.

In one embodiment, heating the second processed material to form the titanium dioxide photocatalyst comprises heating the second processed material at a temperature of about 400° C. to about woo ° C., preferably at a temperature of about 400° C. to about 800° C. or about 500° C. to about 700° C. Preferably, heating the second processed material to form the titanium dioxide photocatalyst comprises heating the second processed material at a temperature of about 400° C., about 500° C., about 600° C., about 700° C., or about 800° C.

In one embodiment, the second processed material is heated for between about 1 hour and about 6 hours, preferably between about 2 hours and about 5 hours, or between about 3 hours and about 4 hours. In one embodiment, the second processed material is heated in a kiln (e.g. a rotary or non-rotatory kiln).

In one embodiment, the titanium dioxide photocatalyst is further processed, for example by grinding or milling, to reduce the particle size of the titanium dioxide photocatalyst. This may, for example, be carried out using a ball mill, high shear mixer, or a pin mill.

In one embodiment, the particulate titanium dioxide photocatalyst has a mean diameter greater than about 1 μm, about 2 μm, about 5 μm, about 8 μm or about 10 μm. Preferably, the particulate titanium dioxide photocatalyst has a mean diameter greater than about 2 μm or about 5 μm. Preferably, the particulate titanium dioxide photocatalyst has a mean diameter greater than about 8 μm or about 10 μm. In some embodiments, the titanium dioxide photocatalyst of the invention will not be absorbed by the plant.

In some embodiments, the particulate titanium dioxide photocatalyst has a mean diameter of no more than about 25 μm, about 20 μm, about 15 μm, about 10 μm, or about 8 μm. In some embodiments, the titanium dioxide photocatalyst of the invention will not easily be washed off the plant.

In one embodiment, the titanium dioxide photocatalyst is added to a liquid to form a suspension so that the concentration of the photocatalyst is between about 200 g/l and about 700 g/l (preferably about 500 g/l). The suspension can therefore be sprayed on a plant surface.

Product by Process

In a fifth aspect, the invention provides a titanium dioxide photocatalyst according to the second aspect and/or an agrochemical composition according to the third aspect produced by a process according to the fourth aspect.

Use of Photocatalyst and/or Agrochemical Composition

In a sixth aspect, the invention provides the use of a titanium dioxide photocatalyst according to the second aspect and/or an agrochemical composition according to the third aspect for improving plant physiology.

The present invention has been shown to be useful in improving plant physiology in vegetable, fruit and flowering plants. For example, the present invention has been shown to be useful in improving plant physiology in ivy and typical greenwall species, cereals (such as wheat and barley) and pea plants. The plants that the present invention can be used with include any that can be benefited from nitrogen.

In a further aspect, the invention provides the use of a titanium dioxide photocatalyst according to the second aspect and/or an agrochemical composition according to the third aspect for improving crop growth/crop yield/crop characteristics. For example, the present invention has been shown to be useful in improving crop yield/crop characteristics in cereals, vegetables, fruit and flowering plants. For example, the present invention has been shown to be useful in improving crop yield/crop characteristics in ivy, wheat and pea plants.

In a further aspect, the invention provides the use of a titanium dioxide photocatalyst according to the second aspect and/or an agrochemical composition according to the third aspect for increasing the nitrogen content of a plant. For example, the present invention has been shown to increase the nitrogen content of cereals, vegetables, fruit and flowering plants. For example, the present invention has been shown to be useful in increasing the nitrogen content of ivy, wheat and pea plants.

In a further aspect, the invention provides the use of a titanium dioxide photocatalyst according to the second aspect and/or an agrochemical composition according to the third aspect for removing nitrogen monoxide or nitrogen dioxide from the atmosphere.

Definitions

A photocatalyst is a material that catalyses a chemical reaction. A titanium dioxide photocatalyst is a photocatalyst that comprises titanium dioxide.

Dopant: an atom/element that is intentionally incorporated in the catalyst's elemental structure or crystal lattice.

Mg/l or mg/lt: milligrams per litre.

NOx: Gaseous nitrous oxides (including nitrogen monoxide and nitrogen dioxide)

ha=hectare t=tiller

Particle Size Distribution

Throughout the present disclosure, the mean diameter is the volume weighted mean diameter measured using a laser diffractometer.

Throughout the present disclosure, the % of particles having a specific diameter is the volume weighted % measured using a laser diffractometer.

The particle size distribution of the photocatalyst of the invention can be measured using the laser diffractometer: Mastersizer 2000, produced by Malvern Instruments Ltd. (software version 5.60). To determine the particle size distribution, a sample of the particles to be measured is dispersed in water and the particle size distribution is measured. The particle size distribution obtained is volume weighted. Therefore, the mean diameter of the particles is the volume weighted mean diameter (D[4,3]); and the % of particles having a specific diameter refers to the volume % of particles having the specific diameter.

Unless otherwise stated, the mean diameter is the volume weighted mean diameter.

EXAMPLES

The most effective titanium dioxide photocatalysts were prepared and tested in accordance with the following examples.

Preparation of Titanium Dioxide Photocatalyst

Manganese sulphate (0.75 g) and calcium carbonate (0.25 g) were added to particulate titanium dioxide (1000 g; having at least 95 vol. % of the particles with a diameter of between 2 μm and 10 μm). The resulting mixture was ball rolled for between 30 and 60 minutes and then pin milled for a further 30 minutes. The process was repeated if the mixture had a uniformity of less than 90%. The mixture was then heated at 600° C. for 3 hours to form the titanium dioxide photocatalyst. After the resulting product cooled, the product was pin milled and sieved until at least 95 vol. % of the particles had diameter of between 2 μm and 10 μm.

Preparation of Composition 500 g of the prepared titanium dioxide photocatalyst was suspended in a composition comprising 750 mL water, 30 g of sodium naphthalene sulphonate formaldehyde condensate, 5 g of silicon based antifoaming agent, 10 g of ethoxylated alcohol, 10 g of cocoyl hydroxyethyl imidazoline based amphoteric surfactant, and 6 g xanthan gum.

The formulation referred to herein additionally contained 2.4% w/w Mn, 1.3% w/w Zn, and 0.07% w/w Mo. The composition had a specific gravity of about 1.5 (1.5 kg/lt).

Characterisation of Titanium Dioxide Photocatalyst

Raman spectra of samples 1-9 of the titanium dioxide photocatalyst were recorded using a LABRAM 300 (Horiba Jobin Yvon) with an excitation line of 532 μm (FIG. 1). The instrument was equipped with an Olympus microscope BX41, which was used to collect Raman spectra from the powder using a 50×, 0.50 NA Leica objective with a long working distance that focused the laser onto the surface of the powder. A sample was placed on microscopic slide and tested by focusing the laser and an output power of 50 mW, 5 s of exposure time, and 2 accumulations were used. The method was used to demonstrate the changes in structure of the produced material and to characterise them.

FIG. 1 shows the Raman spectra of pure titanium dioxide and of titanium dioxide photocatalysts of the present invention (S1-S9 were prepared in accordance with the example above).

Further, XRD analysis was used to characterise and compare the doped titanium dioxide photocatalyst with the raw titanium dioxide using a Bruker make diffractometer, Cu—Kα X-rays of wavelength (λ)=1.5406 Å.

Photocatalytic Activity

The photocatalytic activity of a titanium dioxide photocatalyst was tested using an acetone degradation experiment. 1 g of particulate titanium dioxide and 1 g of a photocatalyst prepared according to the present example were each placed in a separate reaction cell with 3 ml of acetone. The reaction cells were kept in the dark for 30 minutes to reach equilibrium. The reactions cells were then irradiated with UV light (2 15 W 352 nm lamps) for 3 hours. CO2 generation was measured over time. See FIG. 2A (particulate titanium dioxide) and FIG. 2B (photocatalyst of the example).

Figure 2C:
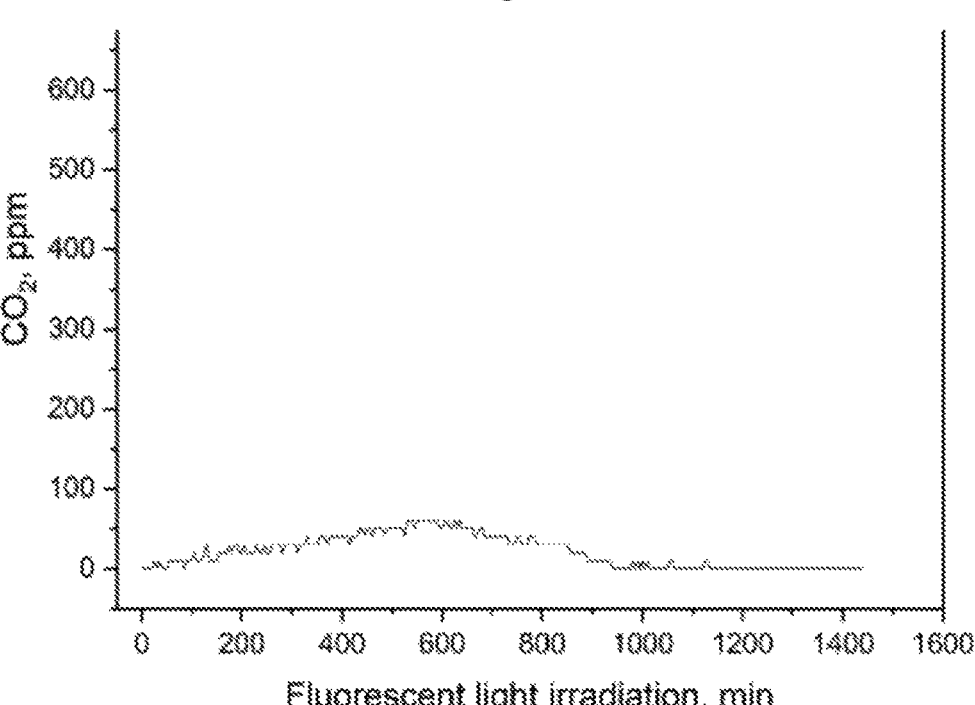
Figure 2D:
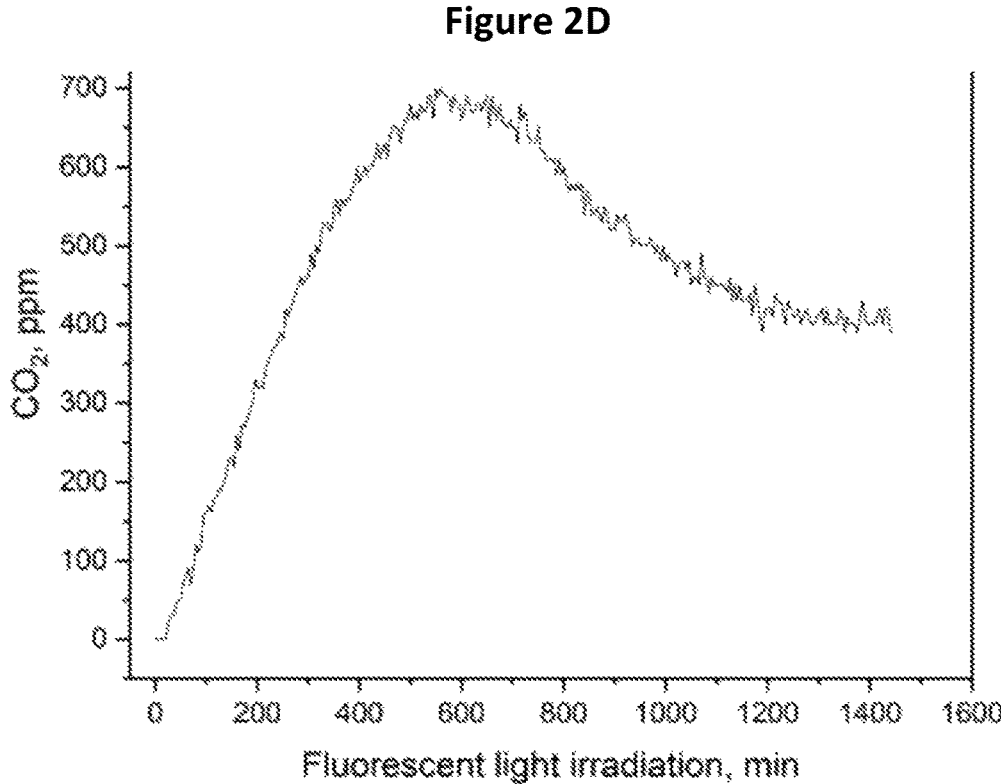
Figure 3:
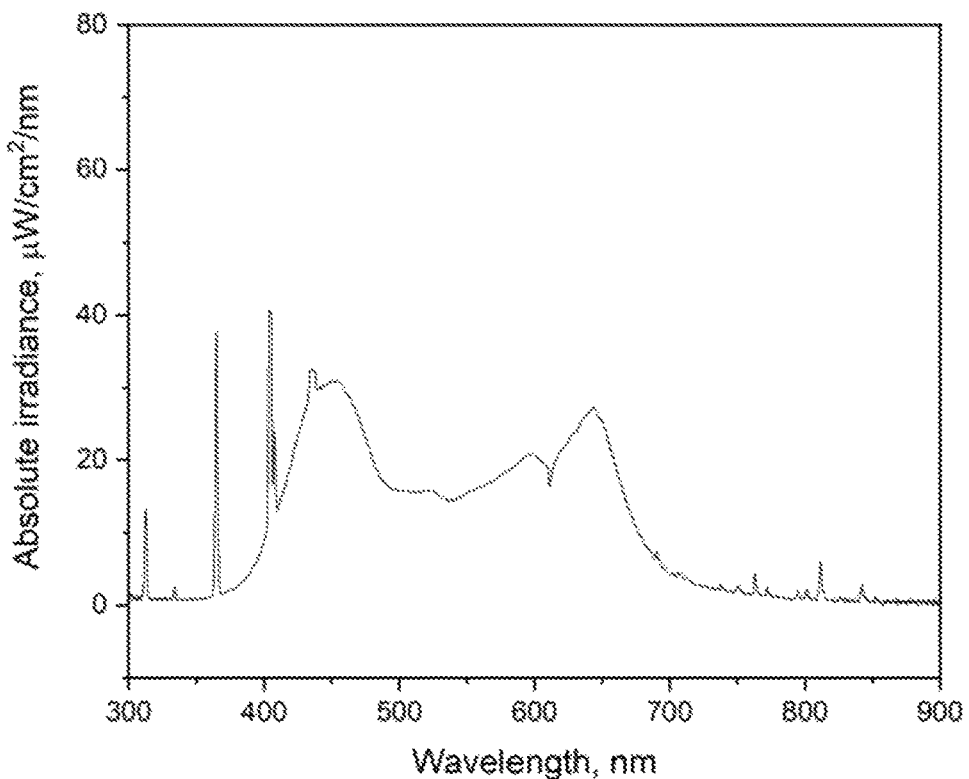
FIG. 3 shows the irradiance spectrum of the fluorescent light source.

The same experiments was conducted but using a different light source (fluorescent/visible spectrum light source). CO2 generation was measured over time (see FIGS. 2C and 2D). The spectrum of the fluorescent light source is shown in FIG. 3).

Figure 2A:
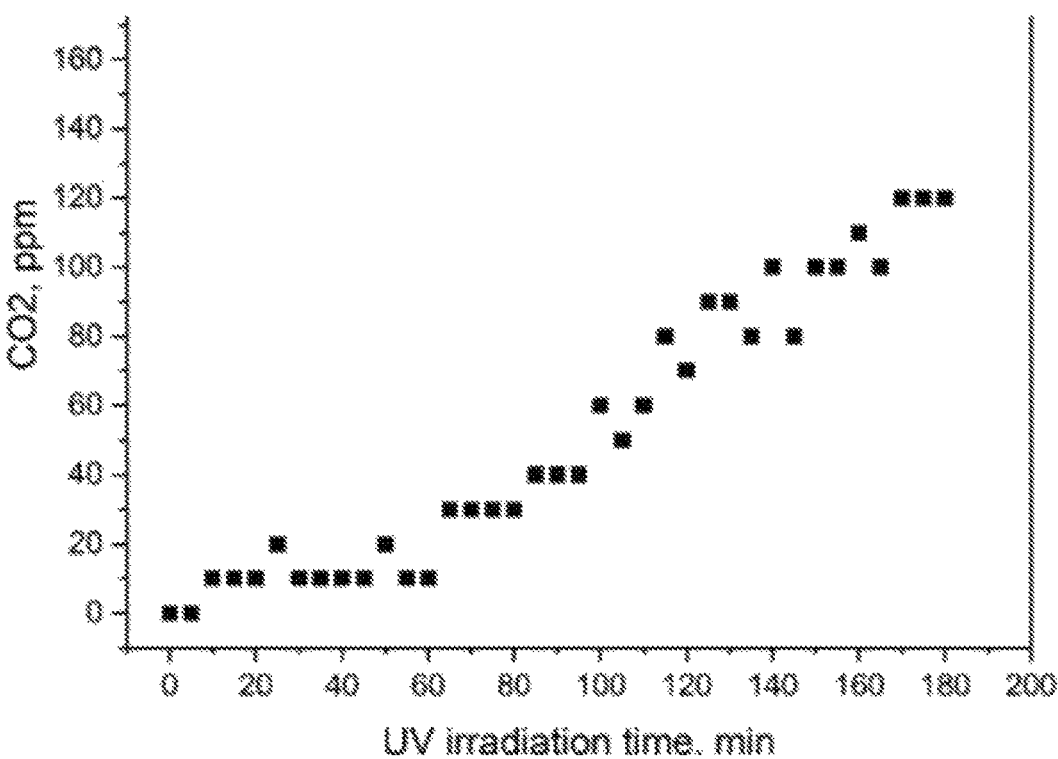
Figure 2B:
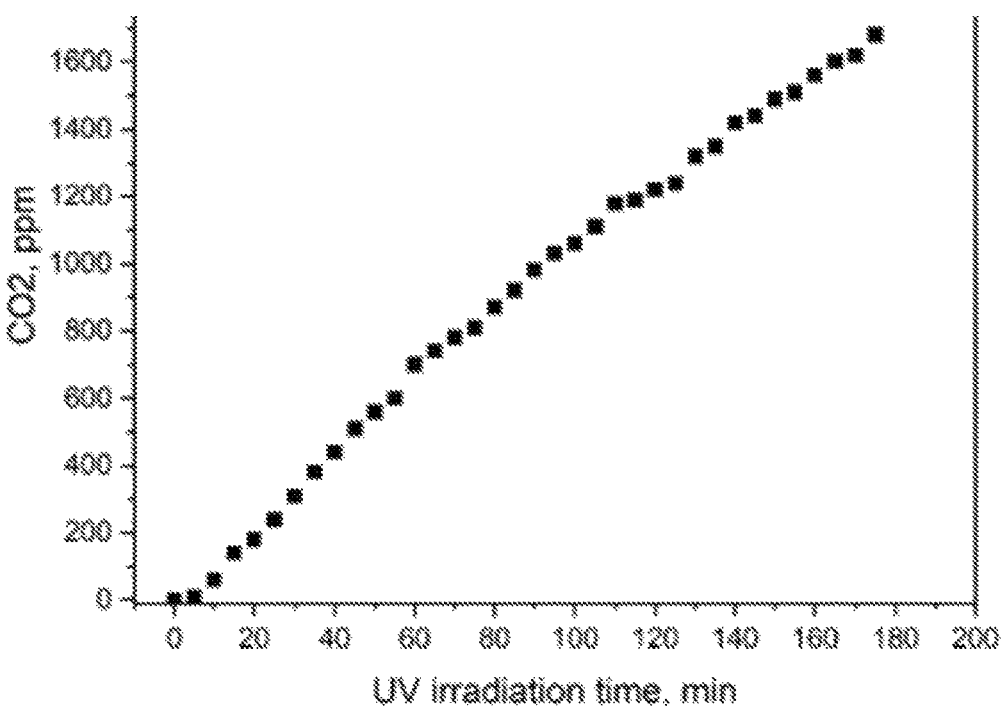

As shown in FIGS. 2A and 2B, the titanium dioxide photocatalyst as prepared in accordance with the example (FIG. 2B) above showed a tenfold increase in its ability to photocatalyse under UV irradiation relative to the raw titanium dioxide (FIG. 2A). This significant increase shows that the photocatalyst of the invention have significant activity and therefore use in industry/agriculture.

Not only do the photocatalysts of the invention show improved activity when irradiated with UV light, they also show a significant improvement when irradiated with the visible spectrum light. FIG. 2D shows that the photocatalyst of the invention are particularly appropriate for application where daylight available, for example on the surface of plants.

Example 1

The formulation of the invention was applied to a first section of green screen of ivy positioned near to a road in Hammersmith, London. The formulation was applied at 3 lt/ha. A second section of the same green screen was left untreated. This was replicated in three areas.

Figure 4:
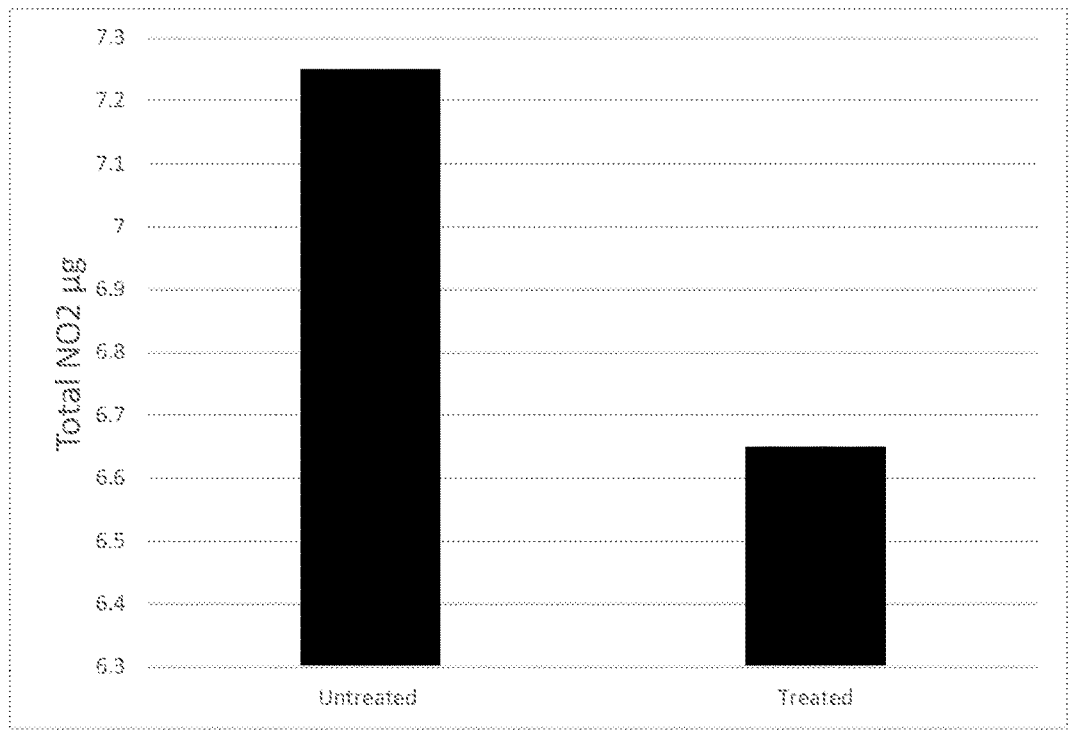
FIGS. 4-16 show the efficacy of titanium dioxide photocatalysts according to some embodiments of the present invention.

The nitrogen dioxide content in the vicinity of the treated and untreated sections of the green screen was measured using a NOx diffusion tube over a period of 8 weeks. As shown in FIG. 4, the total nitrogen dioxide content in the vicinity of the treated section of the green screen was 8.3% lower than the untreated section of the green screen (total of 7.25 μg and 6.65 μg respectively).

A sample of the ivy from each of the treated and untreated sections of the green screen were sent for tissue content analysis. As it can be seen from table 1, total nitrogen content of the ivy from the treated section was 21.3% greater than the ivy from the untreated section. This significant increase is consistent with the understanding that the photocatalyst in the formulation of the invention provides an increase in nitrate to the plant over the 8 week period.

TABLE 1

| Content Analysis | Treated Ivy | Untreated Ivy |
|---|---|---|
| Nitrogen (%) | 2.16 | 1.78 |
| Phosphorous (%) | 0.13 | 0.10 |
| Potassium (%) | 1.52 | 1.01 |
| Sulphur (%) | 0.27 | 0.25 |
| Copper (mg/Kg) | 9.8 | 8.9 |
| Zinc (mg/Kg) | 153.8 | 135.4 |
| Boron (mg/Kg) | 28.4 | 25.1 |

Example 2

The formulation of the invention was applied to sections of grass at three locations (location 1, location 2 and location 3). The formulation was applied at 1 lt/ha at a first subsection and 5 lt/ha at second subsection of grass at each location.

A control formulation was applied to different sections of grass at location 1, location 2 and location 3. The control formulation was the same as the formulation of the invention except that it did not contain the titanium dioxide photocatalyst.

After a period of 4 weeks, samples of the grass were sent for sap content analysis. As can be seen in table 2, the formulation of the invention significantly increased the nitrogen content of the grass. A dose response is also seen. This is explained as more titanium dioxide photocatalyst enables more N to be produced.

TABLE 2

| | Nitrogen Content (mg/Kg): Location 1 | Nitrogen Content (mg/Kg): Location 2 | Nitrogen Content (mg/Kg): Location 3 |
|---|---|---|---|
| Control | 56 | 71 | 71 |
| Formulation of Invention (1 lt/ha) | 76 | 132 | 91 |
| Formulation of Invention (5 lt/ha) | 101 | No data | 122 |

Example 3

The formulation of the invention was applied to sections of a field of wheat (durum) plants and sections of a field of grain pea plants. The formulation was applied three times at 1 lt/ha. The applications were spaced 4-6 weeks apart.

Sections of the field of wheat (durum) plants and the field of grain pea plants were left untreated with the formulation of the invention (but were otherwise treated identically in respect of watering, fertiliser application and herbicide application) to act as a control.

After a period of 12 weeks, samples of the plants were harvested and analysed. As can be seen in table 3, the formulation of the invention significantly increased the total yield of both the wheat plants and grain pea plants. The formulation of the invention also significantly increased the protein content of the grain pea plants.

TABLE 3

| | Wheat (treated) | Wheat (untreated) | Grain Peas (treated) | Grain Peas (untreated) |
|---|---|---|---|---|
| Yield (Kg/ha) | 5270 | 4400 | 6170 | 5100 |
| Protein (%) | No data | No data | 16.5 | 16.1 |

Example 4

The formulation of the invention was applied to a 25 metre×25 metre plot of wheat plants. The formulation was applied twice at 1 lt/ha: (i) when the plants reached three tillers; and (ii) 6 weeks following the first treatment. A corresponding plot of wheat plants was left untreated with the formulation of the invention (but was otherwise treated identically) to act as a control.

The plants were harvested and analysed by an external laboratory. As can be seen in table 4, the formulation of the invention significantly increased yield (tillers per hectare: t/ha), protein content, natural weight and Hagberg content.

TABLE 4

| | Yield (t/ha) | Protein | Moisture | Natural Weight | Hagberg |
|---|---|---|---|---|---|
| Untreated | 10.3 | 10.44 | 17.1 | 64.3 | 179 |
| Treated | 12.3 | 11.05 | 16.5 | 65.6 | 191 |

Example 5

A control formulation and formulations containing the photocatalyst of the example in water (1 lt/ha and 2 lt/ha) were applied to individual plots of wheat crop. The control formulation was water.

Figure 5:
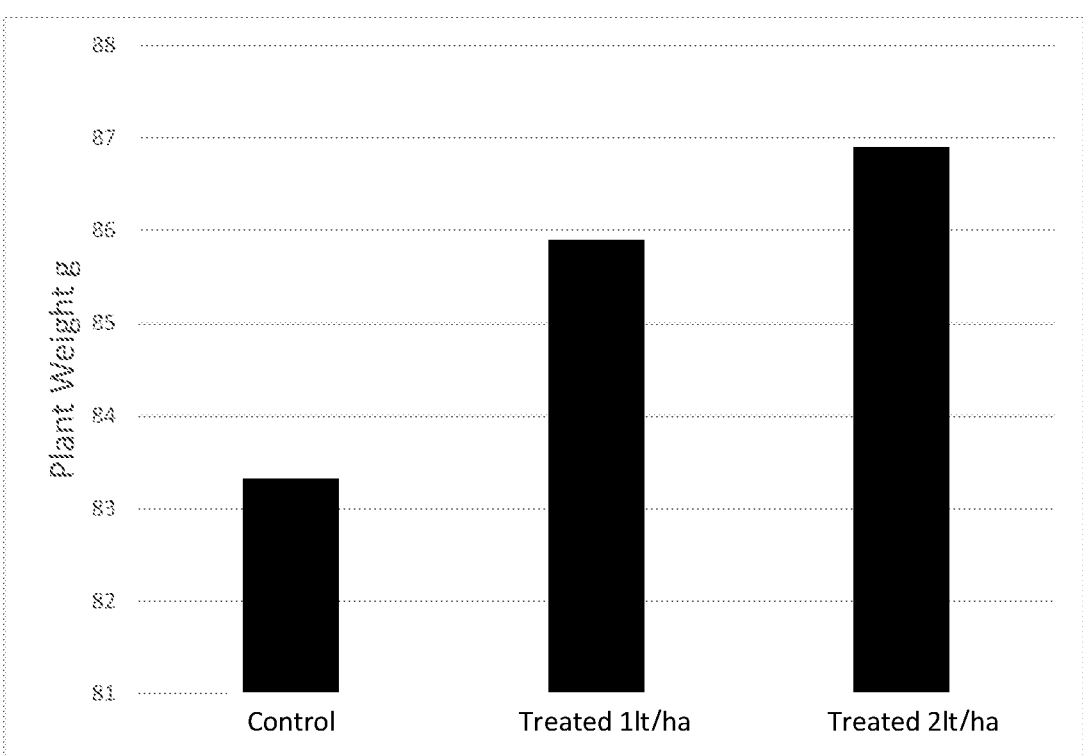
Figure 6:
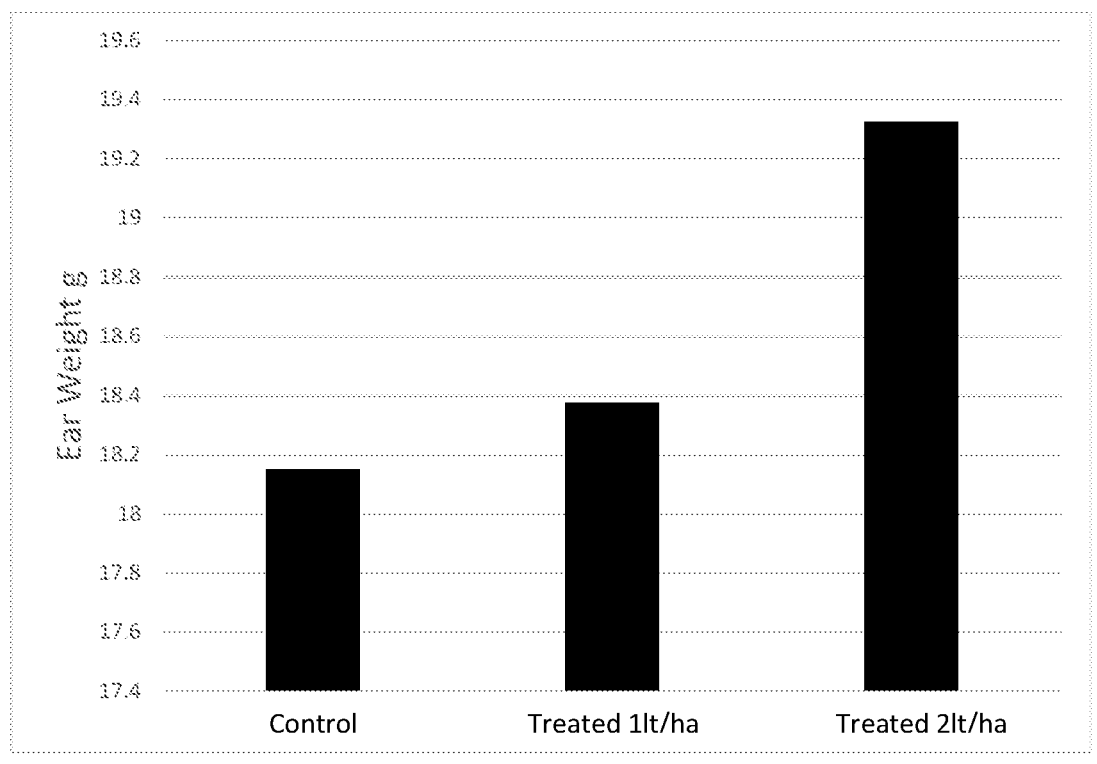
Figure 7:
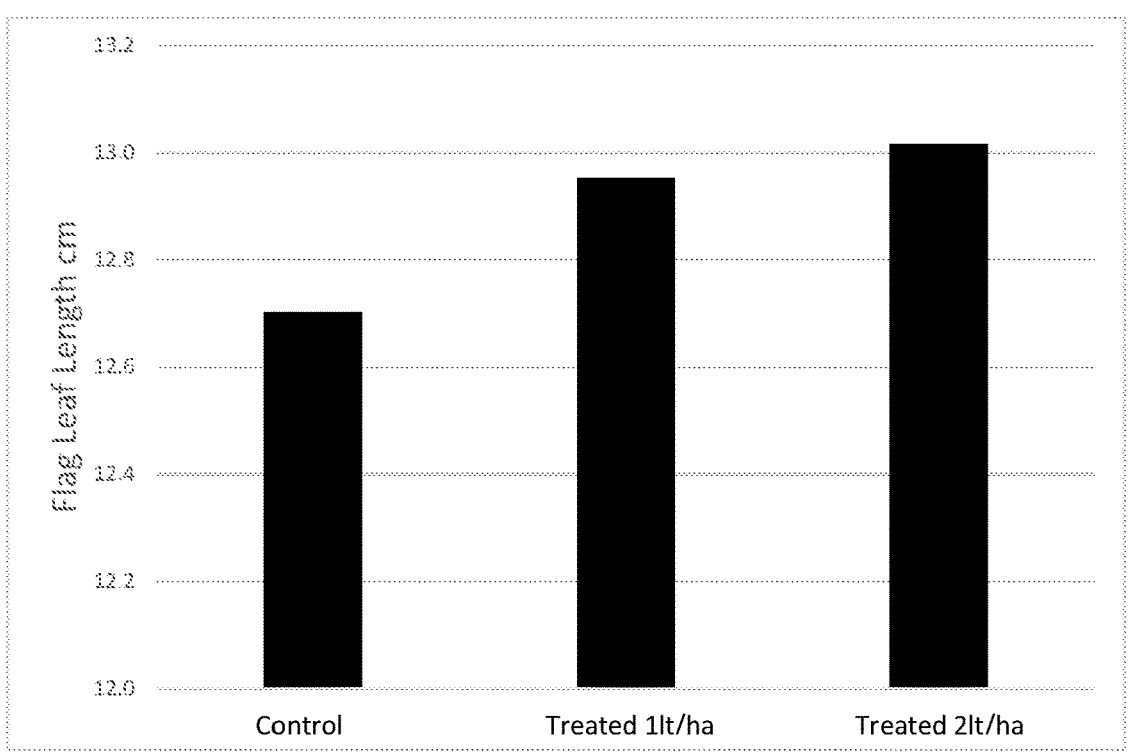

The formulations were applied at 3 tillers and 6 weeks after the first application. Measurements were taken from 10 plants randomly selected from each plot. The weight of plants, the weight of the ears (heads) only, and the length of the flag leaf were measured. The results (shown in FIGS. 5, 6 and 7) clearly demonstrate that the photocatalyst of the invention improves crop growth.

Example 6

Plots of a wheat field were treated with a control formulation, a formulation comprising 6 g of titanium dioxide, a formulation comprising 3 g of a Mn doped titanium dioxide, a formulation comprising 6 g of a Mn doped titanium dioxide, or a formulation comprising 6 g of the titanium dioxide photocatalyst according to the present example. The medium of the formulations was water, with the control formulation comprising only water.

Figure 8:
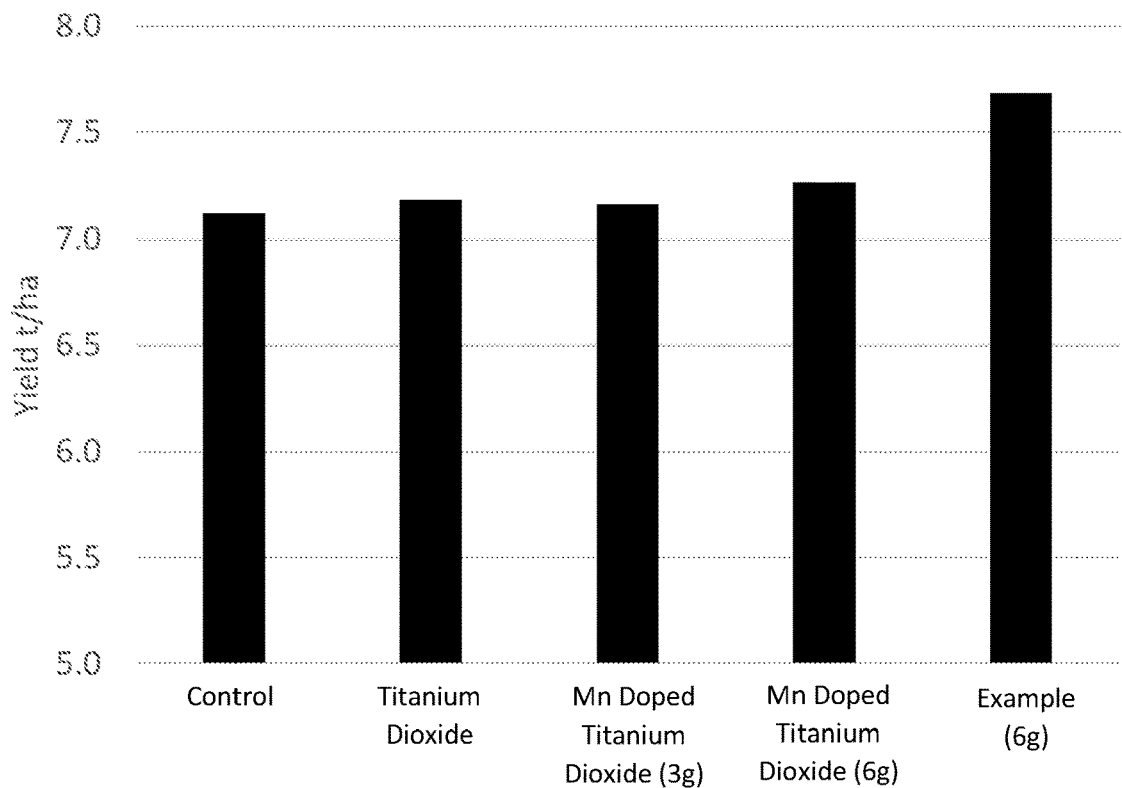
Figure 9:
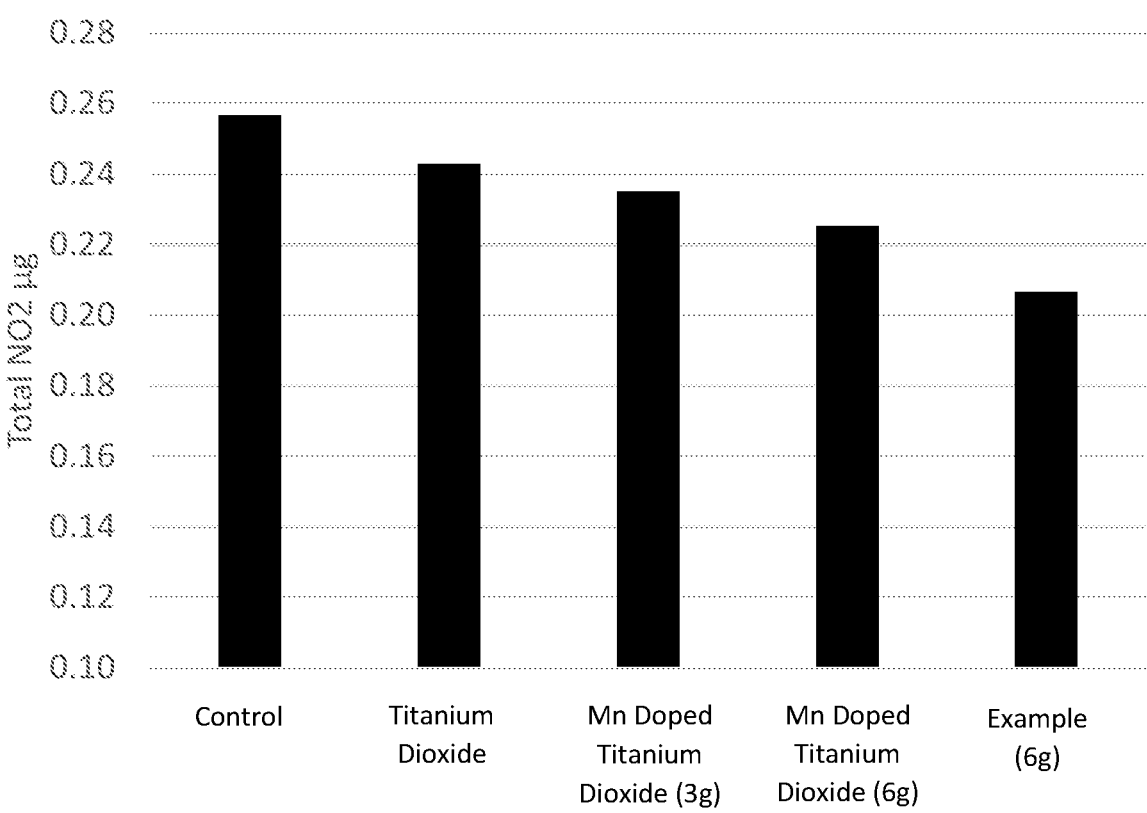

Five NOx diffusion tubes were placed in each of the plots of the wheat field. Four of the five NOx diffusion tubes from each plot were sent for analysis before harvest (at regular intervals from application of the formulations until harvest). The fifth NOx tube was sent for analysis at harvest. In this example, the wheat plants were harvested when the seed moisture level was 17%. The yield was then calculated. FIG. 8 shows the yield of each plot. FIG. 9 shows the total NO2 measured at each plot.

As shown in FIG. 8, the formulation comprising titanium dioxide, the formulation comprising 3 g of a Mn doped titanium dioxide, or the formulation comprising 6 g of a Mn doped titanium dioxide did not significantly increase yield relative to the control formulation. In contrast, the formulation comprising 6 g of the titanium dioxide photocatalyst according to the present example increased yield significantly.

As shown in FIG. 9, the formulation comprising 6 g of the titanium dioxide photocatalyst according to the present example reduced the concentration of nitrogen dioxide significantly more than any other formulation.

It is also noted that whilst the formulation comprising titanium dioxide, the formulation comprising 3 g of a Mn doped titanium dioxide, and the formulation comprising 6 g of a Mn doped titanium dioxide slightly reduced the nitrogen dioxide concentration relative to the control, this reduction did not result in a significant increase in yield. In contrast, the formulation comprising 6 g of the titanium dioxide photocatalyst according to the present example reduced the concentration of nitrogen dioxide and increased the yield. As such, it is clear that the photocatalyst of the invention converts nitrogen dioxide to nitrate and makes the nitrate available for the plant to uptake and utilise which increases plant growth/yield.

Example 7

A large scale field trial was conducted in Eastchurch, Kent, U.K. Areas of winter wheat were designated as a control area or an area for treatment. In both the control area and the area for treatment, normal farming practices were observed. The area for treatment was additionally treated with a formulation of the invention. Said formulation was applied at 1 lt/ha at (i) BBCH growth stage 31-32 and (ii) BBCH growth stage 39.

On harvest, the yield of the area treated with said formulation was 11.6 t/ha whereas the yield of the control area was 9.5 t/ha. Treatment with said formulation resulted in an increase in yield of 2.1 t/ha.

In the same trial, the nitrogen dioxide content in the vicinity of the treated area and control are was measured using NOx diffusion tubes over a period of 6 weeks. The total nitrogen dioxide measured for the area treated with said formulation was 1.3 $\mu g/m^3$ whereas the total nitrogen dioxide measured for the control area was 2.37 $\mu g/m^3$. Treatment with said formulation resulted in a decrease in total nitrogen dioxide of 46%.

Example 8

In a field plot trial, areas of winter wheat were designated as a control area or an area for treatment (area size of 12 $m^2$). The normal farming practices were modified so that the amount of ammonium nitrate was reduced from 210 Kg/ha to 137 Kg/ha. The area for treatment was additionally treated with a formulation of the invention. Said formulation was applied at 1 lt/ha (in approximately 150 lt of water) at (i) BBCH growth stage 30; (ii) BBCH growth stage 31-32; and (iii) BBCH growth stage 37-39.

Figure 10:
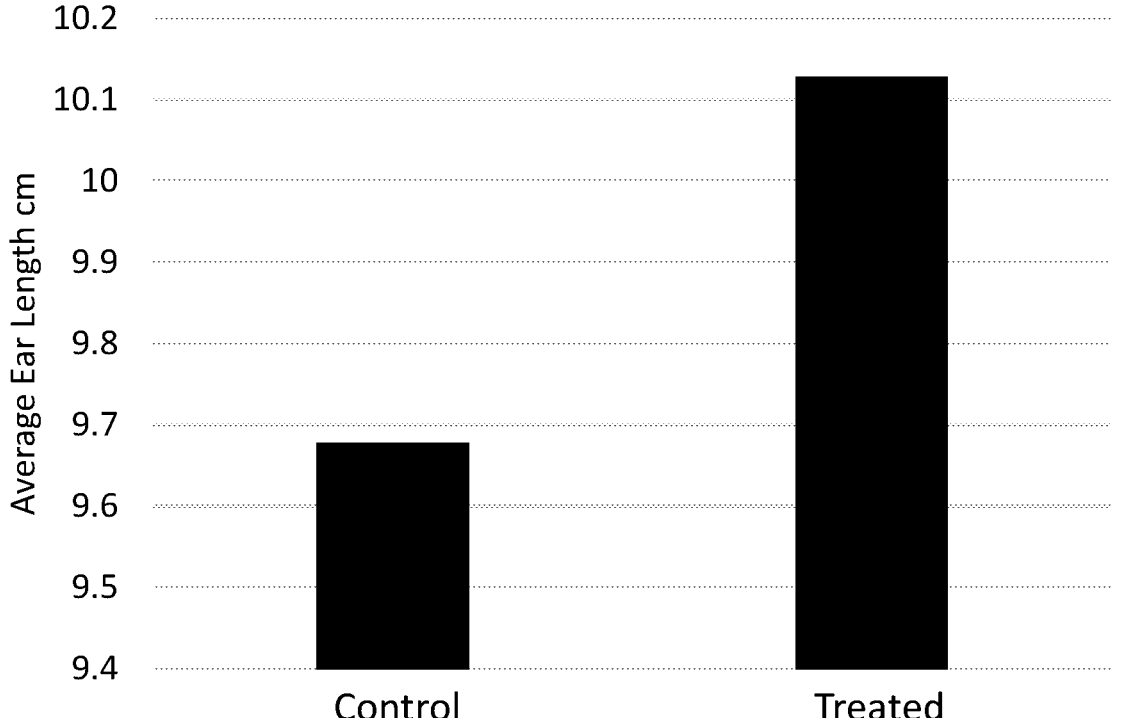

From both of the control area and area for treatment, 10 wheat heads were randomly selected prior to harvest and their ear length was measured. As shown in FIG. 10, treatment with said formulation resulted in a significant increase in ear length, even under reduced nitrogen conditions.

A similar trial was carried out on Edgar variety wheat. Areas of the wheat were designated as a control area, a reduced nitrogen area or an area for treatment. In this trial the reduced nitrogen area and the area for treatment were both treated with 50% of the nitrogen that the control area was treated with. The area for treatment was additionally treated with a formulation of the invention. Said formulation was applied at 1 lt/ha (in approximately 150 lt of water) at (i) BBCH growth stage 30; (ii) BBCH growth stage 31-32; and (iii) BBCH growth stage 37-39.

The reduced nitrogen area produced a reduced yield relative to the control area. The area for treatment also produced a reduced yield relative to the control area. However, it was surprisingly found that the area for treatment produced a yield that was significantly higher than the yield of the reduced nitrogen area. 65% of the decrease in yield of the reduced nitrogen area (relative to the control area) had been compensated for by application of the formulation of the invention.

Additionally, it was found that the formulation of the invention when applied at 3 lt/ha would compensate for the reduced nitrogen conditions by 100%. That is, an area for treatment produces a yield the same as that of a control area despite having 50% less nitrogen applied. This has significant implications as it allows farmers to reduce the nitrogen application by 50% without compromising yield. This approach would significantly reduce the problem of over application of nitrogen and will increase soil sustainability over time.

Example 9

An area of standard garden lawn was marked at the University of Lincoln, Riseholme Campus, NL2 2LG, UK. The lawn was mowed to reach a uniform height. The area was divided in a randomised block pattern (each plot being 4 m×1.5 m) into areas for treatment or control areas. On 20 Jul. 2021, the areas for treatment were sprayed with a formulation of the invention (at 1 lt/ha). Both the control area and the area for treatment were also sprayed with 200 lt/ha of water and nitrogen at 200 Kg/ha.

The average nitrogen tissue content was analysed (using a handheld Horiba NO3 tester) on $23^{rd}$ July, $27^{th}$ July and $3^{rd}$ August. The results are shown in table 5.

TABLE 4

|  | kg/ha N Fertiliser Equivalent | |
|  | Treated | Control |
| --- | --- | --- |
| 20TH JULY | 90 | 109 |
| 23RD JULY | 168 | 106 |
| 27TH JULY | 250 | 88 |
| 3RD AUGUST | 157 | 26 |

As shown in table 4, treatment with said formulation of the invention significantly improves the nitrogen tissue content of standard garden lawn.

Example 10

An area of professional turf was divided into areas for treatment, areas for treatment with fertiliser, or control areas. The areas for treatment were sprayed with:

Application 1: Formulation of the invention (at 1 lt/ha) and an NPK fertiliser (ICL Greenmaster series) (at 20 lt/ha in 250 lt water).

Application 2: Formulation of the invention (at 1 lt/ha) and an NPK fertiliser (ICL Greenmaster series) (at 30 lt/ha in 250 lt water).

Application 2 was 20 days after application 1. The NPK fertiliser has an NPK (nitrogen: phosphorous: potassium) ratio of 15:0:5. The areas for treatment with fertiliser were treated in the same way as the areas for treatment but without the formulation of the invention. The control area only had water applied at 250 lt/ha.

Figure 11:
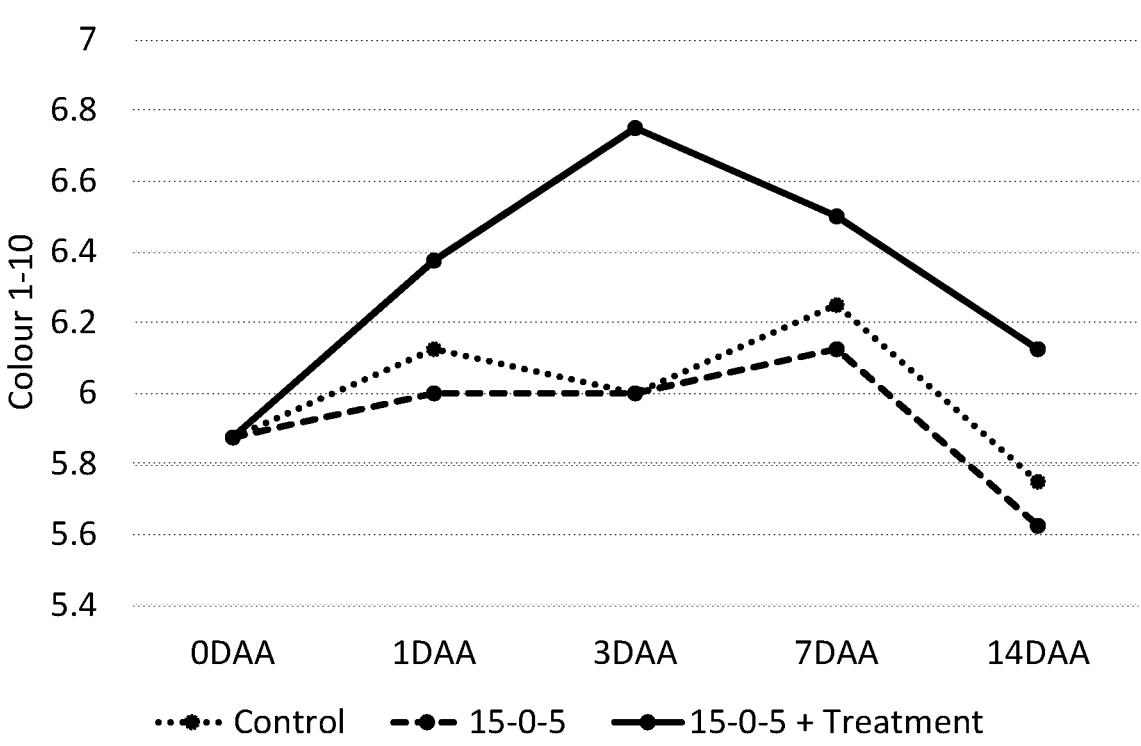
Figure 12:
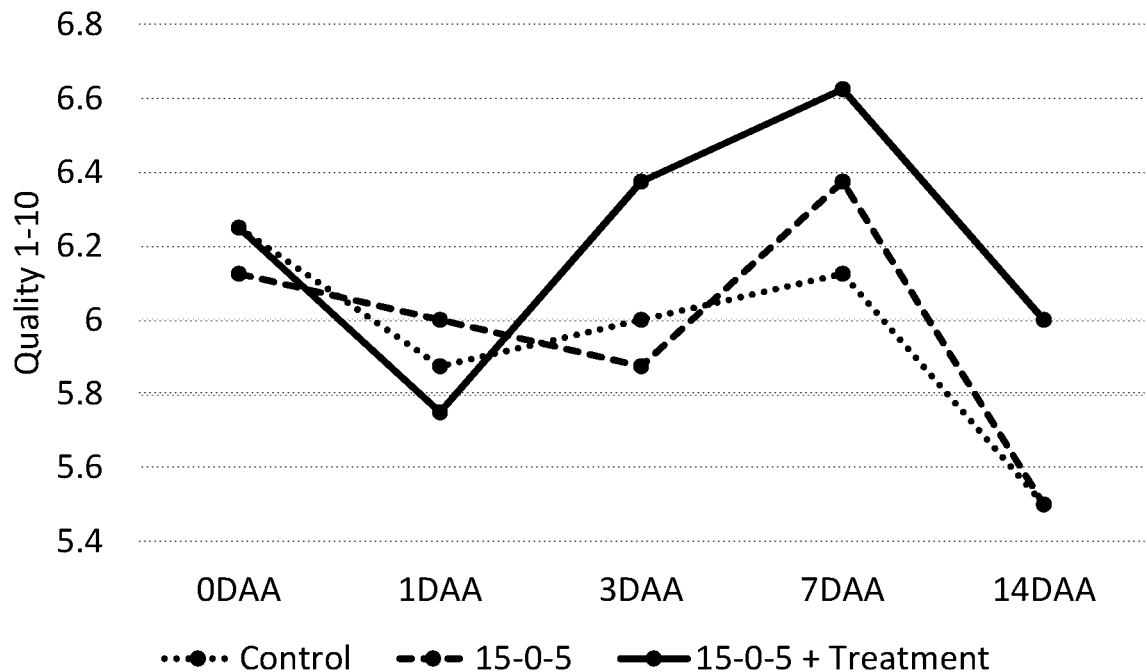

The colour and quality of the turf was assessed on treatment, 1 day after treatment (1DAA), 3 days after treatment (3DAA), 7 days after treatment (7DAA), and 14 days after treatment (14DAA) for application 1. The results are shown in FIGS. 11 and 12.

Figure 13:
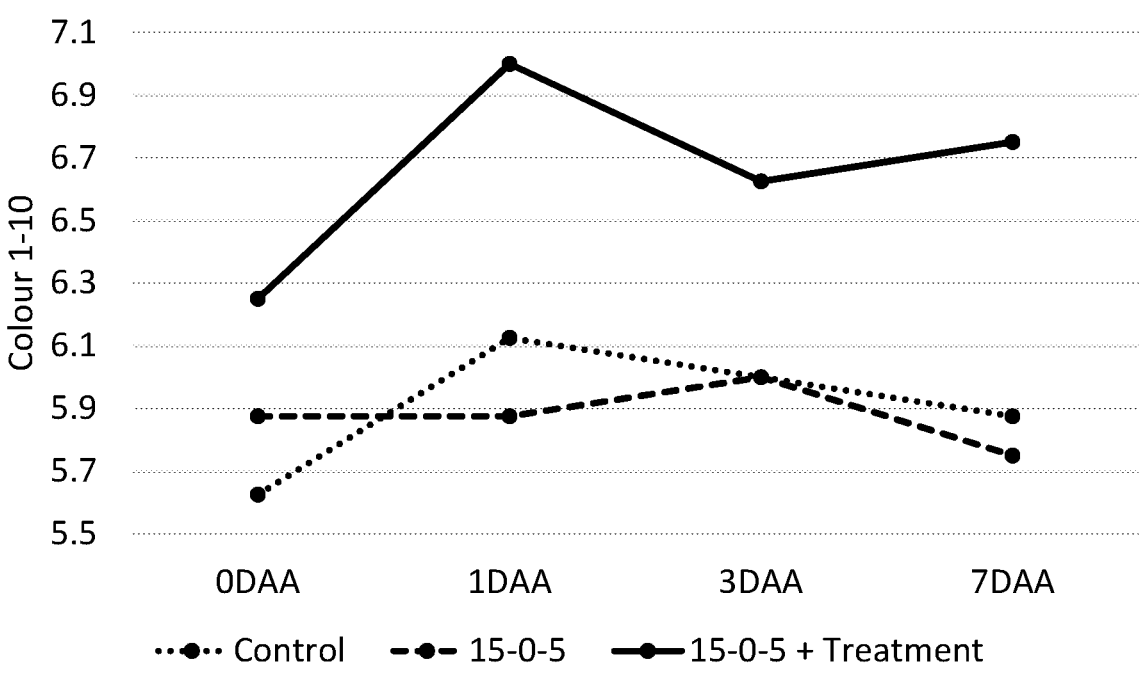
Figure 14:
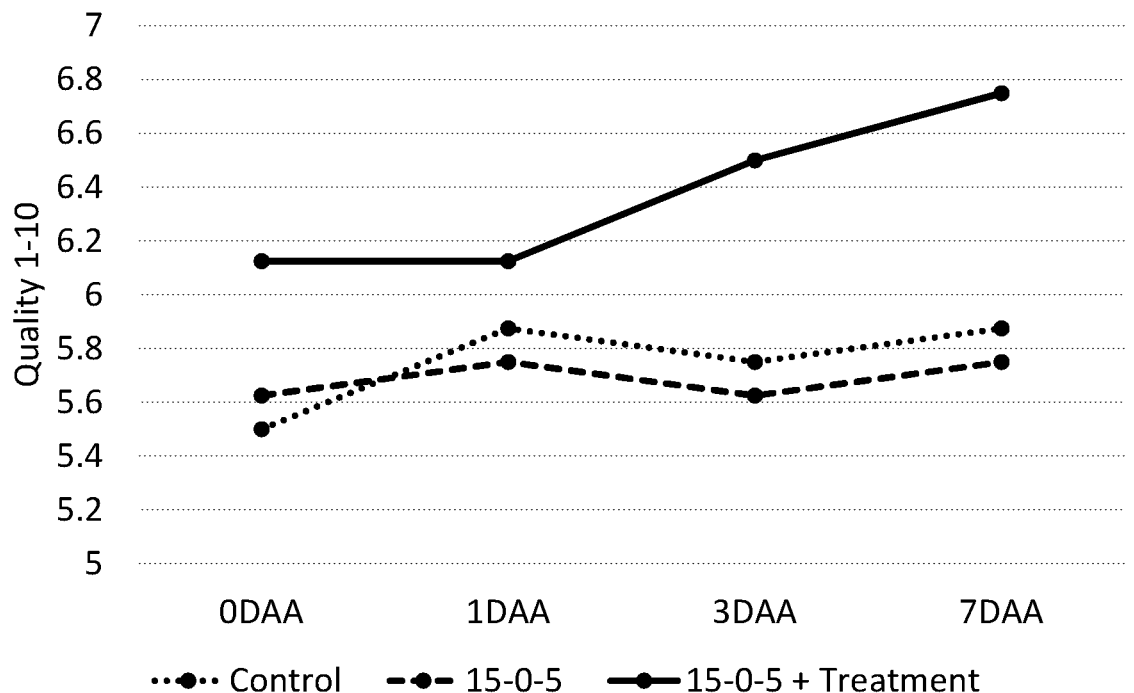

The colour and quality of the turf was assessed on treatment, 1 day after treatment (1DAA), 3 days after treatment (3DAA), and 7 days after treatment (7DAA) for application 2. The results are shown in FIGS. 13 and 14. As shown in FIGS. 11 to 14, the photocatalyst of the invention synergistically improves plant growth when used in combination with fertilisers.

Example 11

In a field trial areas of wheat were designated as a control area or an area for treatment. In both the control area and the area for treatment, normal farming practices were observed. The area for treatment was additionally treated with a formulation of the invention. Said formulation was applied at 1 lt/ha at (i) BBCH growth stage 31-32 and (ii) BBCH growth stage 39.

Figure 15:
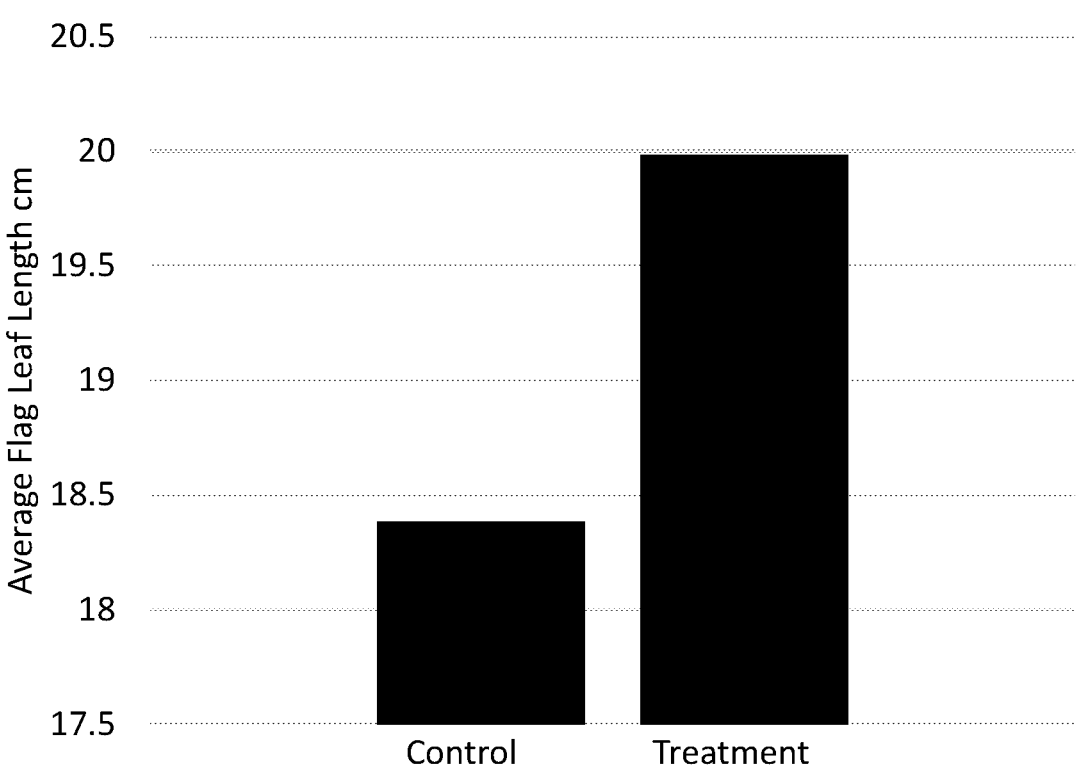
Figure 16:
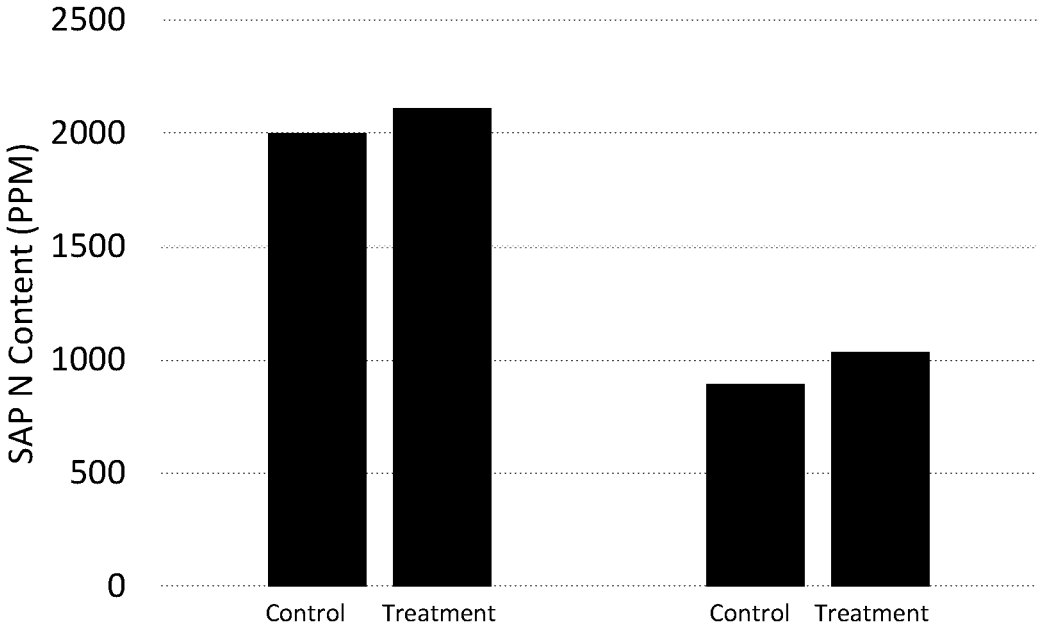

On harvest, the yield of the area treated with said formulation was 9.09 t/ha whereas the yield of the control area was 10.19 t/ha. Treatment with said formulation resulted in an increase in yield of 1.1 t/ha. The average flag leaf length and nitrogen content of the leaf and head was also measured. The results are shown in FIGS. 15 and 16.

The invention claimed is:

1. A method of increasing growth of a plant, the method comprising applying a titanium dioxide photocatalyst to a surface of the plant, and converting nitrogen monoxide or nitrogen dioxide to nitrate on the surface of the plant, wherein the titanium dioxide photocatalyst is a particulate titanium dioxide photocatalyst which has a mean diameter greater than about 1 μm and no more than about 10 μm and wherein the titanium dioxide photocatalyst is doped with at least Mn and Ca.

2. The method according to claim 1, wherein the nitrate is absorbed by the plant.

3. The method according to claim 1, wherein the method comprises spraying the titanium dioxide photocatalyst onto a surface of a plant.

4. The method according to claim 1, wherein the nitrogen monoxide or nitrogen dioxide is atmospheric nitrogen monoxide or nitrogen dioxide.

5. The method according to claim 1, wherein the nitrate is washed from the titanium dioxide photocatalyst by application of a water source to the surface of the plant.

6. The method according to claim 1, wherein the particulate titanium dioxide photocatalyst has a mean diameter greater than about 2 μm.

7. The method according to claim 1, wherein at least about 70 vol. % of the particulate titanium dioxide has a diameter between about 2 μm and about 10 μm.

8. The method according to claim 1, wherein the titanium dioxide photocatalyst has a surface area of greater than about 5000 m² per 500 g, about 7000 m² per 500 g, or about 10,000 m² per 500 g.

9. The method according to claim 1, wherein the ratio Mn to Ca is between about 10:1 and about 1:10.

10. The method according to claim 1, wherein the titanium dioxide photocatalyst is catalytically active when exposed to light with a wavelength between about 300 and about 800 nm.

11. The method according to claim 1, wherein the titanium dioxide photocatalyst is catalytically active when exposed to light with a wavelength between about 430 and about 550 nm.

12. The method according to claim 1, wherein the titanium dioxide photocatalyst comprises the dopant in an amount between about 0.01 wt. % and about 1 wt. %.

13. The method according to claim 1, wherein the method comprises applying the titanium photocatalyst once per 10 days/growing cycle, once per 30 days/growing cycle, or once per 60 days/growing cycle.

14. The method according to claim 1, wherein the titanium dioxide photocatalyst is applied in amount from about 50 g/ha (hectare) to about 80 g/ha, from about 100 g/ha to about 250 g/ha, or from about 200 g/ha to about 500 g/ha.

15. The method according to claim 1, wherein the titanium dioxide photocatalyst is applied in an amount of about 400 g/ha or about 500 g/ha.

16. The method according to claim 1, wherein the method comprises applying a fertiliser to the plant with or separately to the titanium dioxide photocatalyst.

17. The method according to claim 1, wherein the titanium dioxide photocatalyst is part of an agrochemical composition, the agrochemical composition comprising the titanium dioxide photocatalyst suspended in an aqueous or non-aqueous medium.

18. The method according to claim 1, wherein the titanium dioxide photocatalyst is part of an agrochemical composition, the agrochemical composition comprising water, sodium naphthalene sulphonate formaldehyde condensate, a silicon based antifoaming agent, ethoxylated alcohol, a cocoyl hydroxyethyl imidazoline based amphoteric surfactant, xanthan gum or a mixture thereof.

19. The method according to claim 1, wherein the titanium dioxide photocatalyst is part of an agrochemical composition, the agrochemical composition comprising water, sodium naphthalene sulphonate formaldehyde condensate, a silicon based antifoaming agent, ethoxylated alcohol, a cocoyl hydroxyethyl imidazoline based amphoteric surfactant, and xanthan gum.

* * * * *